(12) United States Patent
Burton

(10) Patent No.: US 11,965,544 B2
(45) Date of Patent: *Apr. 23, 2024

(54) BALL STUD TRACK ASSEMBLY

(71) Applicant: Burton Technologies, LLC, Ludington, MI (US)

(72) Inventor: John E. Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,010

(22) Filed: May 18, 2021

(65) Prior Publication Data
US 2021/0270315 A1 Sep. 2, 2021

Related U.S. Application Data

(63) Continuation of application No. 16/441,327, filed on Jun. 14, 2019, now Pat. No. 11,022,171.

(60) Provisional application No. 62/687,321, filed on Jun. 20, 2018.

(51) Int. Cl.
 *F16C 11/06* (2006.01)
 *B60Q 1/068* (2006.01)

(52) U.S. Cl.
 CPC ...... *F16C 11/0695* (2013.01); *F16C 11/0623* (2013.01); *B60Q 1/068* (2013.01); *B60Q 2200/32* (2013.01)

(58) Field of Classification Search
 CPC .............. F16C 11/0657; F16C 11/0683; F16C 11/0623; F16C 11/0695
 See application file for complete search history.

(56) References Cited

U.S. PATENT DOCUMENTS 6,976,773 B2 * 12/2005 Cavanna ............. F16C 11/0657
362/427

* cited by examiner

*Primary Examiner* — Daniel J Wiley
(74) *Attorney, Agent, or Firm* — James A. Joyce; Godfrey & Kahn, S.C.

(57) ABSTRACT

A ball stud track assembly includes a ball track and connector portion, the ball track comprising a back inner sidewall having a lower portion with a lower portion top surface and an upper portion having a retention ridge, an upper retaining arm extending from a front inner sidewall of the ball track and terminating at an upper arm end portion surface, and a lower retaining arm extending from the lower portion of the back inner sidewall and having a lower arm top surface, the upper arm end portion surface, the lower portion top surface, and the lower arm top surface extend to form a longitudinal ball channel having a central longitudinal ball channel axis, the ball channel configured to receive a ball stud head and allow sliding longitudinal movement, while restricting movement of the ball stud head along axes perpendicular to the central longitudinal ball channel axis.

25 Claims, 16 Drawing Sheets

BALL STUD TRACK ASSEMBLY

CROSS-REFERENCE

This application is a continuation of patent application Ser. No. 16/441,327 filed on Jun. 14, 2019, which was based on U.S. Provisional Patent Application Ser. No. 62/687,321 filed on Jun. 20, 2018, of which priority is claimed and the disclosures of which are incorporated herein by reference for all purposes.

FIELD OF THE INVENTION

The present invention relates generally to the field of pivot joint fasteners and has been found particularly useful as a pivot joint for connecting a headlamp adjuster to a reflector of a headlamp assembly. In particular, the present invention is a ball stud track assembly that permits a ball stud to both pivot within and slide along the length of a track.

BACKGROUND OF THE INVENTION

Pivotable spherical joints, commonly referred to as ball joints, generally include a ball stud engaged in a socket. Such joints have a wide variety of applications where a pivotable connection between two parts is desirable. For example, they may be used in many types of linear actuators and have been found to be particularly useful in automotive lamp assemblies. As seen generally in FIG. 1 of U.S. Pat. No. 5,707,133 the disclosure of which is incorporated herein by reference for all purposes, automotive lamp assemblies used as headlights typically comprise several basic parts: a support frame, a reflector, a lens, a bulb, and one or more adjusters.

In the automotive lamp assembly example, the support frame houses the reflector and the bulb on a pivotable mounting to allow the aim of the light to be adjusted using the adjuster. The lens seals the front of the assembly to protect it from the elements assailing the front end of the vehicle and provides an aerodynamic shape and attractive appearance. Typically, the reflector mounts inside the housing on one fixed ball joint and is adjustable horizontally and vertically using adjusters that interface with the reflector through moving ball joints. The moving ball joints are moveable by actuating the adjusters connected to the moving ball joints by a ball stud having a head and a shaft. Another type of automotive headlamp assembly that uses linear actuators is shown in U.S. Pat. No. 5,360,282. In this type of headlamp assembly the linear actuator is mounted to a bracket and the ball joint end supports a reflector, lens, and light bulbs. This type of application requires a higher strength ball joint due to the additional weight being supported. In particular, pull-out strength of the ball joint needs to be greater to withstand vibration.

Conventional ball joints for use in automotive lamp assemblies typically include a ball stud with a spherical engagement head extending from an adjuster. The ball stud is moveable linearly in and out of the adjuster. While generally effective, there are a number of shortcomings to using a ball stud in a conventional socket that includes a plurality of resilient tabs to retain the ball stud. One such shortcoming is that the tabs typically contact the ball stud sphere up to or on a "tangent point," that is on an imaginary line between the pivot center of the ball stud and the center of the resilient tab, e.g., the configuration shown in U.S. Pat. No. 6,758,622, the disclosure of which is incorporated herein by reference for all purposes. This configuration causes the force generated when the stud is subjected to pull-out force to be directed along the imaginary line. This configuration results in a condition where the ball stud may be pulled out of socket under certain conditions of operation, such as vibration while supporting heavier reflectors, or in heavier headlamp assemblies, like the one previously referenced in U.S. Pat. No. 5,360,282, leaving the adjuster non-operational. This unexpected pull-out generally occurs because the retention tabs are necessarily flexible to allow the head to be installed in the socket. Though pull-out of the ball stud is resisted to some degree of success, but if enough pull-out force is applied, the tabs deflect, and the ball stud head slips through and "pops out." Reducing the flexibility of tabs is not a desirable option because it would either be too difficult to insert the ball stud head into the socket, or the elasticity of the tabs would be lessened to the degree that they would break off during insertion of the ball stud.

Insertion force of a ball stud into a socket in an automotive headlamp assembly is typically desired to be less than 125N to allow for hand assembly. Most existing ball-sockets are not able to achieve such a low insertion force without sacrificing pull-out resistance due to their construction. As a result, the typical insertion force for the existing ball-sockets (when using a full round plastic ball stud) is around 199 N when the socket is made from a polyoxymethylene ("POM") plastic with a relatively flexible tensile modulus of around 1300 MPa. And the pull-out force is roughly the same. Unfortunately, it is often desired to achieve a pull-out force resistance of 400 N or higher.

While steel ball studs, particularly those with an undercut behind the head of the ball stud or ears that engage tabs or other structures can achieve high pull-out force resistance, it is often preferred to use a plastic ball stud to enable the use of more compact and lighter weight adjuster designs. Further, plastic ball studs can be designed that have undercuts behind the heads, tabs, or other retaining structure, but for manufacturing, installation, and design flexibility, a full round ball stud head is generally preferred.

Accordingly, the need exists for an improved track style ball socket mount that among other things, securely retains a ball stud placed therein, permits the ball stud to both pivot and slide, is cost effective, has a suitable insertion force requirement, and has significant resistance to accidental pull-out.

SUMMARY OF THE INVENTION

The present invention is a ball stud track assembly that is engageable with a boss in a headlamp reflector assembly. The ball stud track assembly includes a ball track that accepts a ball stud with a minimal amount of required insertion force, permits the ball stud to both pivot and slide within the ball track, and provides a significant pull-out force resistance.

In at least some embodiments, a ball stud track assembly is provided that includes: a base having a ball track integrally formed with a connector portion, the ball track comprising: a front inner sidewall positioned opposite a back inner sidewall, wherein the back inner sidewall includes a lower portion having a lower portion top surface, and an upper portion having a retention ridge fixed in position relative to the back inner sidewall; an upper retaining arm extending from the front inner sidewall and terminating at an upper arm end portion surface; and a lower retaining arm extending from the lower portion of the back inner sidewall and having a lower arm top surface, wherein the upper arm end portion surface, the lower portion top surface, and the lower arm top surface extend to form a longitudinal ball channel having a central longitudinal ball channel axis, the ball channel configured to receive a ball stud head of a ball stud and allow sliding longitudinal movement of the ball stud head along the central longitudinal ball channel axis, while restricting movement of the ball stud head along axes perpendicular to the central longitudinal ball channel axis.

In at least some other embodiments, a ball track is provided that includes a front inner sidewall positioned opposite a back inner sidewall, wherein the back inner sidewall includes a lower portion having a lower portion top surface, and an upper portion having a retention ridge fixed in position relative to the back inner sidewall; an upper retaining arm extending from the front inner sidewall and terminating at an upper arm end portion surface; and a lower retaining arm extending from the lower portion of the back inner sidewall and having a lower arm top surface, wherein the upper arm end portion surface, the lower portion top surface, and the lower arm top surface extend to form a longitudinal ball channel having a central longitudinal ball channel axis, the ball channel configured to receive a ball stud head of a ball stud and allow sliding longitudinal movement of the ball stud head along the central longitudinal ball channel axis, while restricting movement of the ball stud head along axes perpendicular to the central longitudinal ball channel axis.

While at least one possible application of the ball stud track assembly is in connection with an automotive lamp assembly (e.g., a reflector assembly), many other applications are possible and references to use in connection with a reflector assembly should not be deemed to limit the uses of the ball stud track assembly. For example, the ball stud track assembly can be used with components coupled thereto that are not associated with a reflector assembly. The terms used herein should not be interpreted as being limited to specific forms, shapes, or compositions. Rather, the parts may have a wide variety of shapes and forms and may be composed of a wide variety of materials. These and other objects and advantages of the ball stud track assembly will become apparent from the detailed description, claims, and accompanying drawings.

BRIEF DESCRIPTION OF THE DRAWINGS

Embodiments of the ball stud track assembly are disclosed with reference to the accompanying exemplary drawings, which are for illustrative purposes. Various portions of the assembly may be omitted from illustrations or illustrated with dashed lines in one or more FIGS. in order to provide a view of underlying components. The ball stud track assembly is not limited in application to the details of construction or the arrangement of the components illustrated in the drawings. The ball stud track assembly is capable of other embodiments or of being practiced or carried out in various other ways.

DETAILED DESCRIPTION

Figure 1:
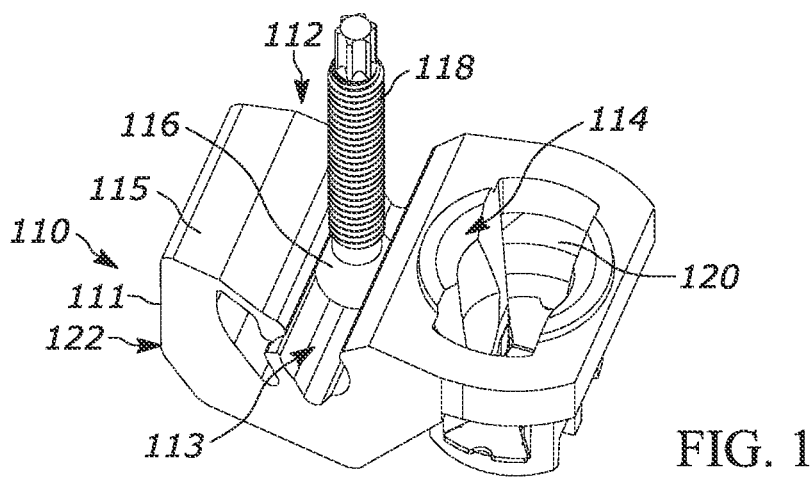
FIG. 1 is a top perspective view of an exemplary embodiment of a ball stud track assembly with a retention clip and shown coupled with a ball stud and a mounting boss.
Figure 2:
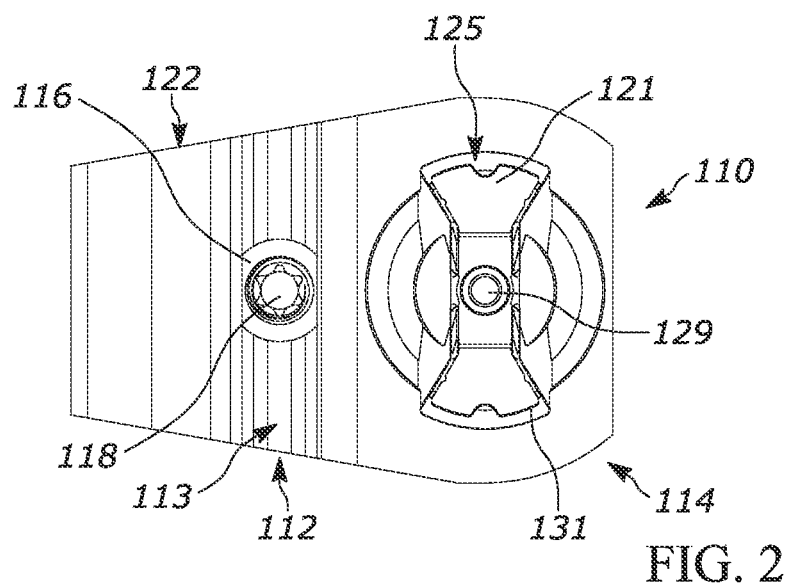
FIG. 2 is a top view of the ball stud track assembly coupled with the ball stud of FIG. 1.
Figure 3:
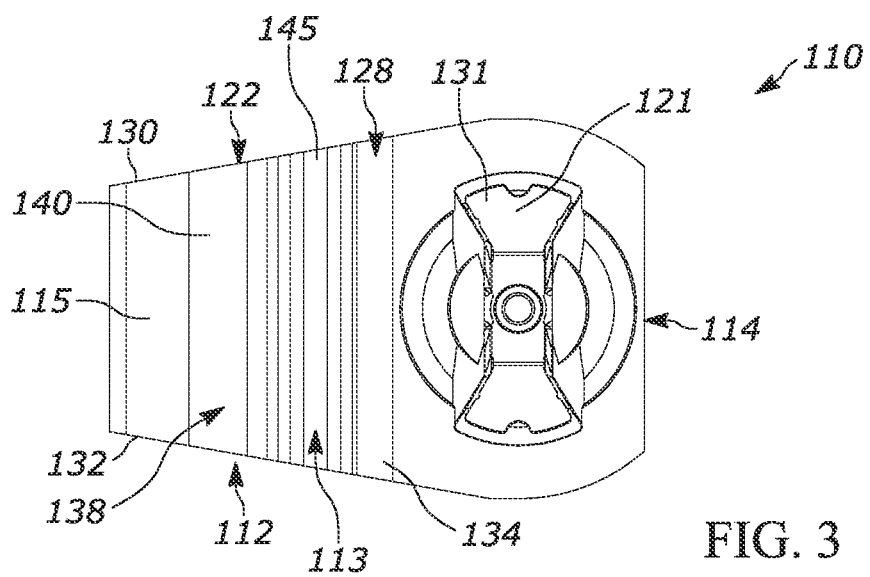
FIG. 3 is a top view of the ball stud track assembly of FIG. 1.
Figure 4:
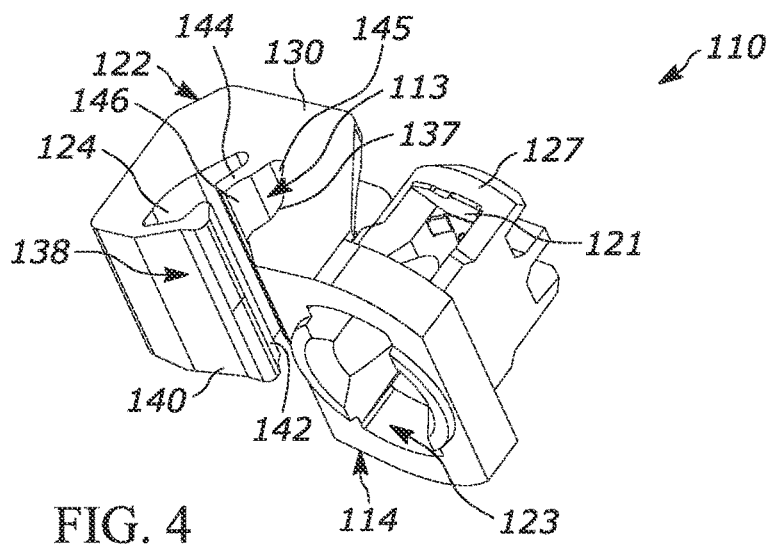
FIG. 4 is a side perspective view of the ball stud track assembly of FIG. 1.
Figure 5:
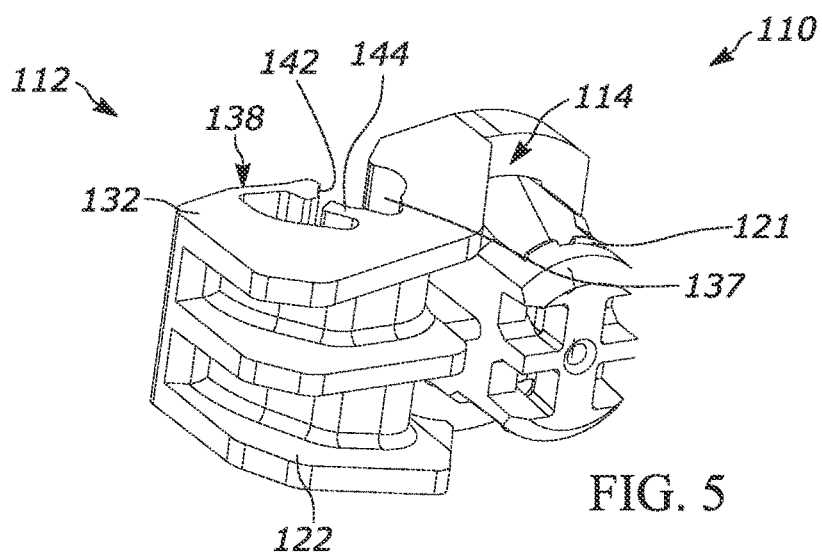
FIG. 5 is a bottom perspective view of the ball stud track assembly of FIG. 1.
Figure 6:
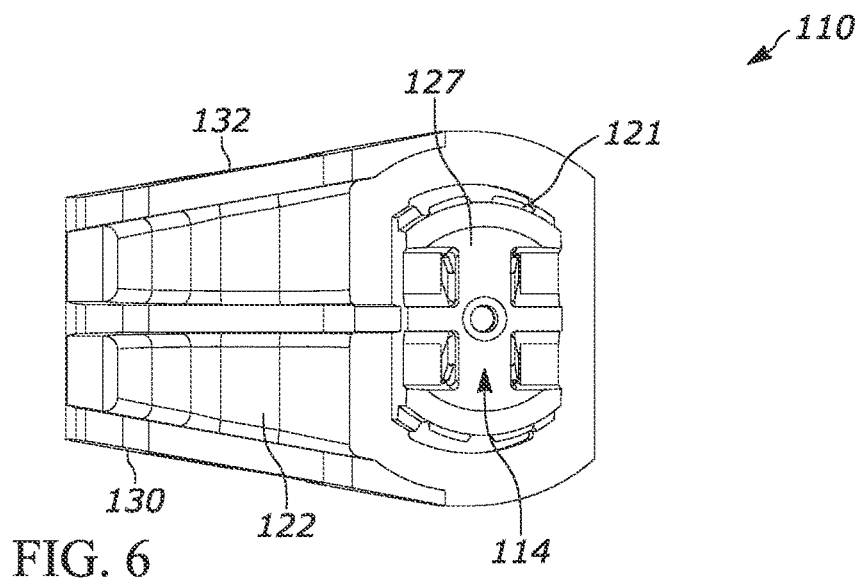
FIG. 6 is a bottom view of the ball stud track assembly of FIG. 1.
Figure 7:
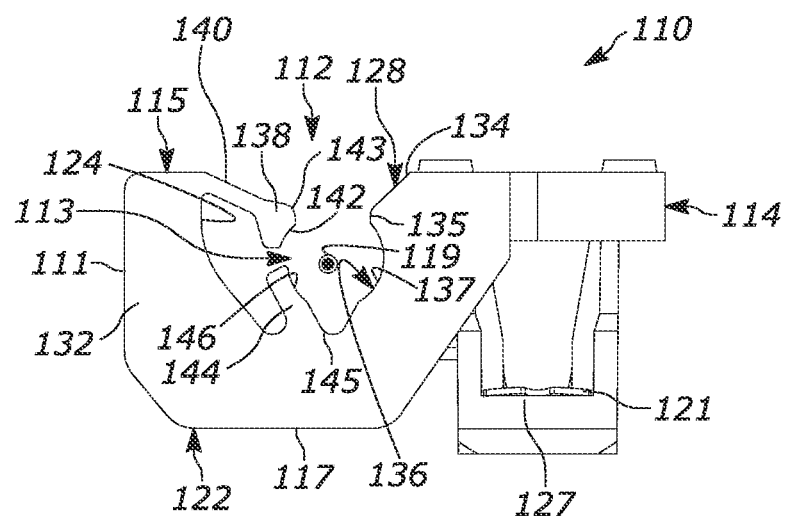
FIG. 7 is a side view of the ball stud track assembly of FIG. 1.
Figure 8:
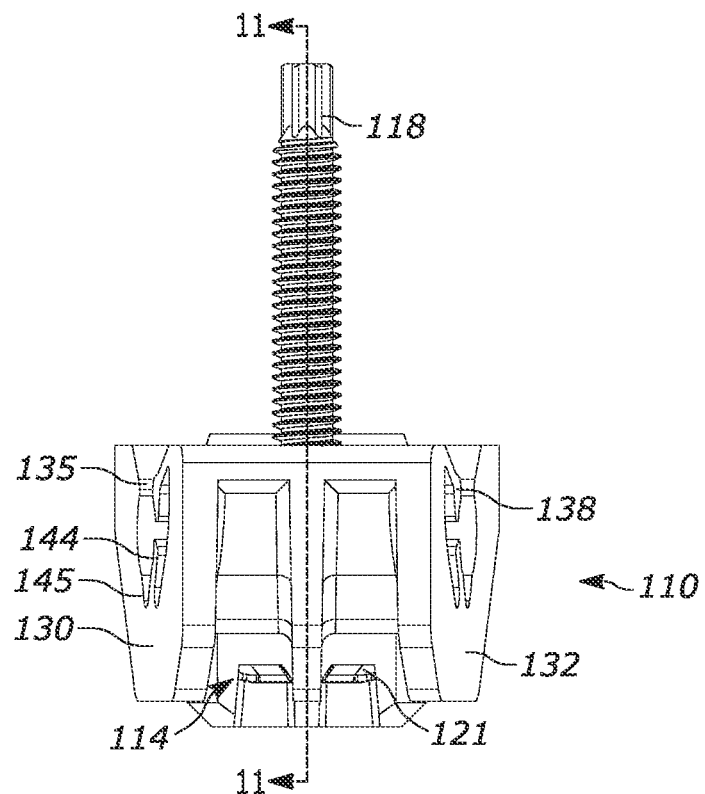
FIG. 8 is a front view of the ball stud track assembly of FIG. 1 shown coupled with the ball stud.
Figure 9:
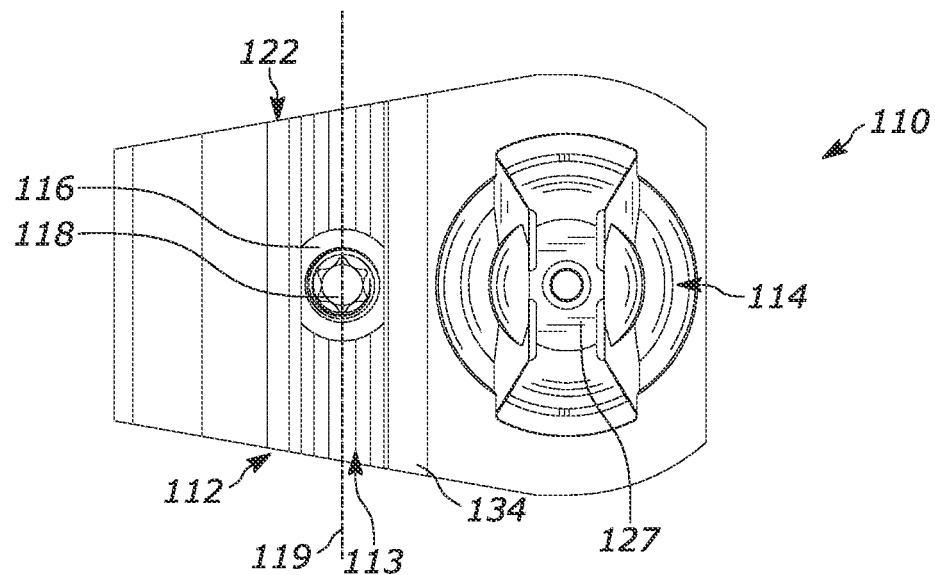
FIG. 9 is a top view of the ball stud track assembly of FIG. 1 shown without the retention clip and coupled with the ball stud.
Figure 10:
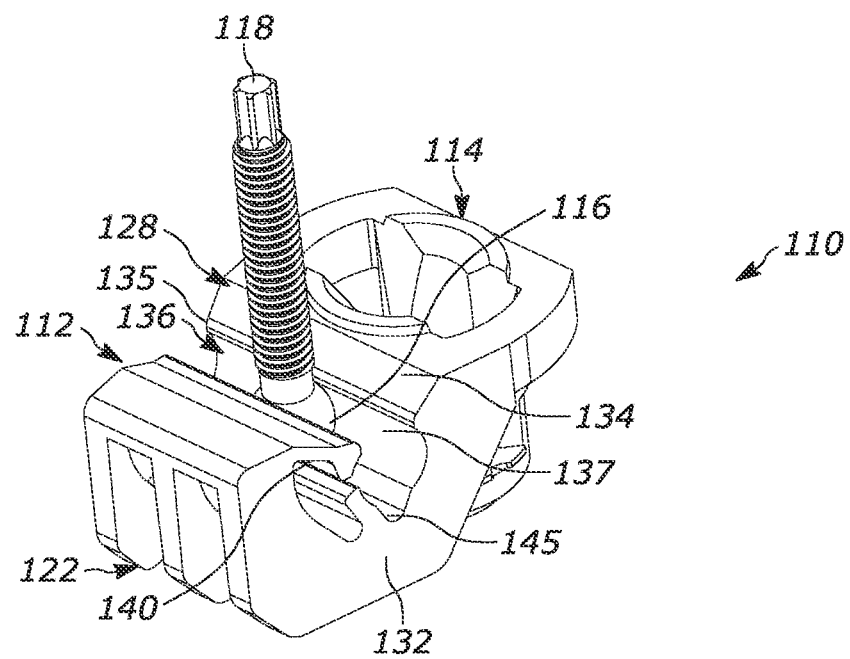
FIG. 10 is a top perspective view of the ball stud track assembly of FIG. 1 shown coupled with the ball stud.
Figure 11:
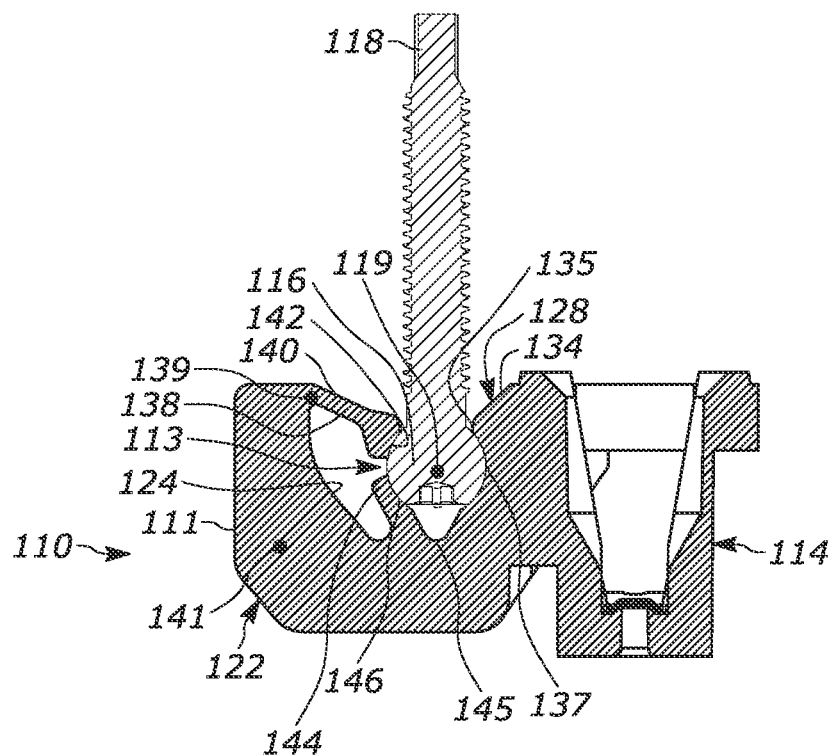
FIG. 11 is a cross-sectional side view of the ball stud track assembly of FIG. 1 shown coupled with the ball stud, taken generally along the line 11-11 of FIG. 8.
Figure 12:
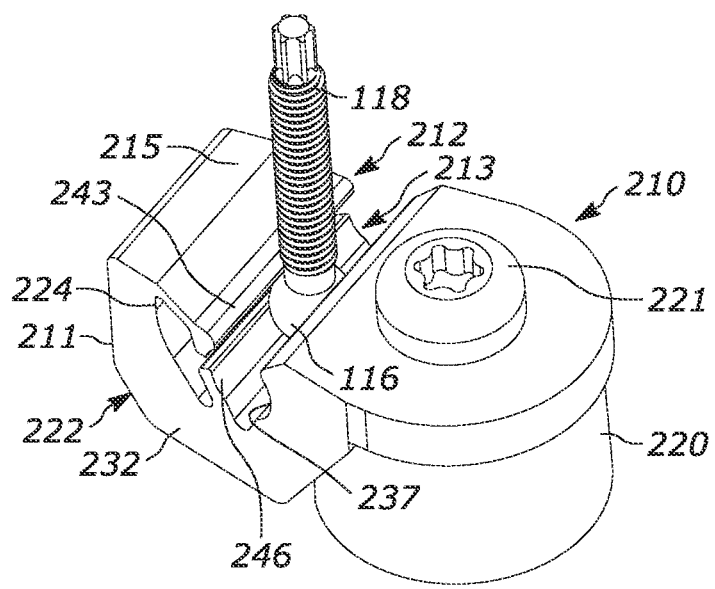
FIG. 12 is a top perspective view of another exemplary embodiment of a ball stud track assembly shown coupled with a ball stud and a mounting boss.
Figure 13:
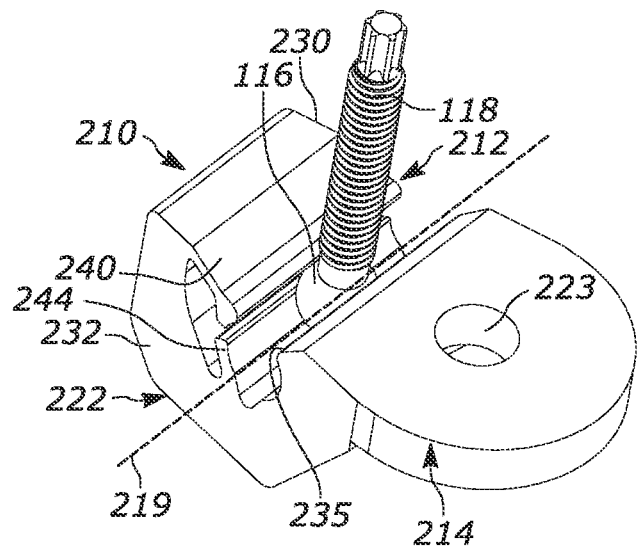
FIG. 13 is a top perspective view of the ball stud track assembly of FIG. 12 shown coupled with the ball stud.
Figure 14:
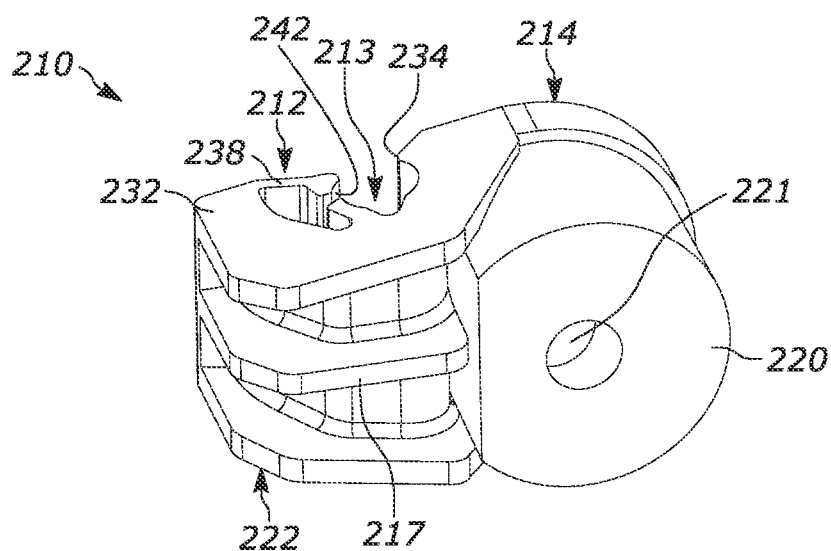
FIG. 14 is a bottom perspective view of the ball stud track assembly of FIG. 12 shown with a fastener.
Figure 15:
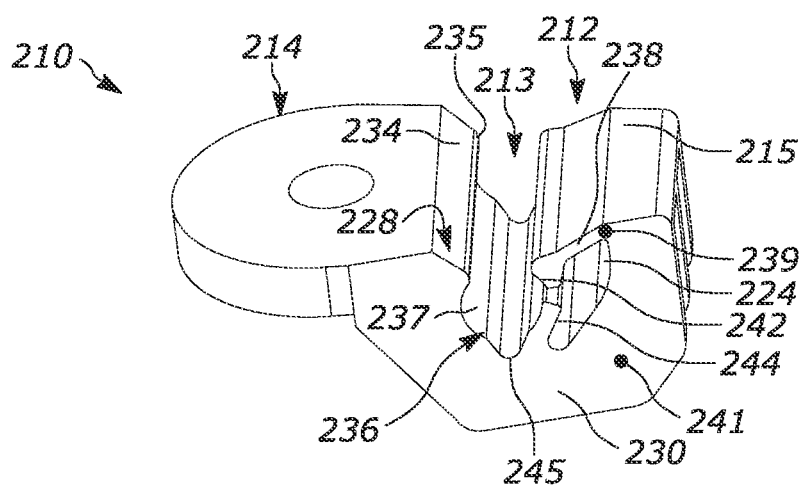
FIG. 15 is another top perspective view of the ball stud track assembly of FIG. 12 shown without a fastener and not secured to the mounting boss.
Figure 16:
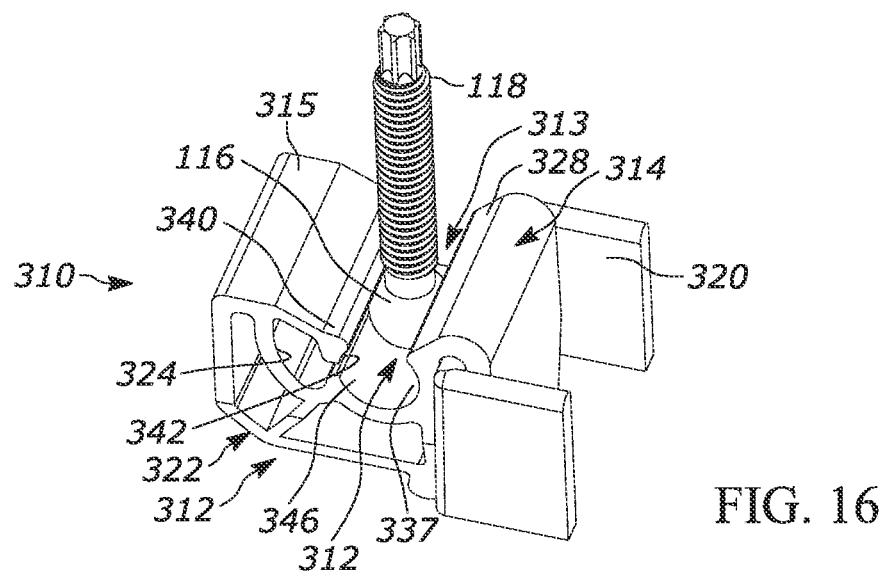
FIG. 16 is a top perspective view of still another exemplary embodiment of a ball stud track assembly shown coupled with a ball stud and a mounting boss.
Figure 17:
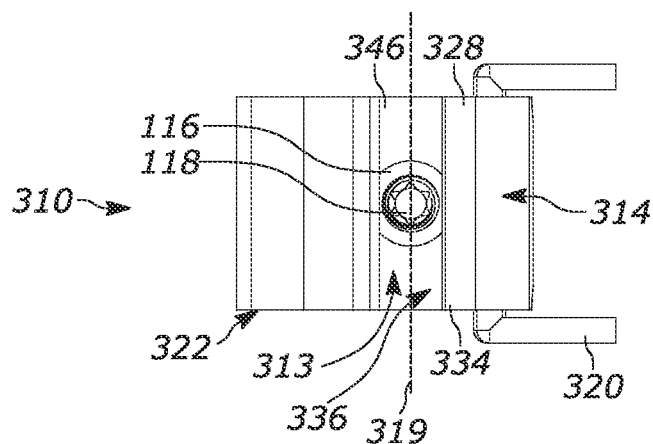
FIG. 17 is a top view of the ball stud track assembly of FIG. 16 shown coupled with the ball stud and the mounting boss.
Figure 18:
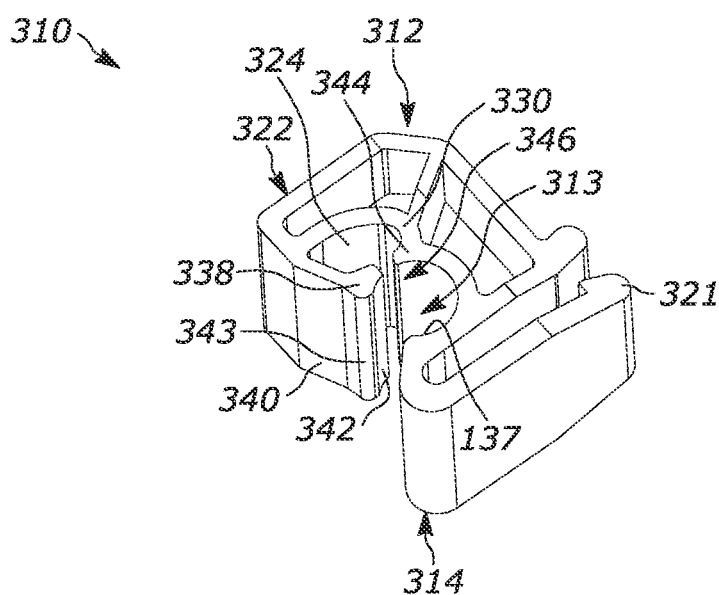
FIG. 18 is a side perspective view of the ball stud track assembly of FIG. 16.
Figure 19:
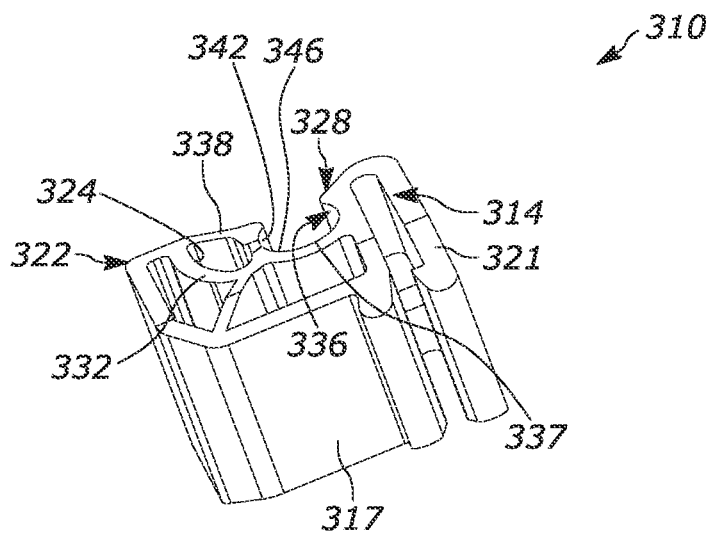
FIG. 19 is a bottom perspective view of the ball stud track assembly of FIG. 16.
Figure 20:
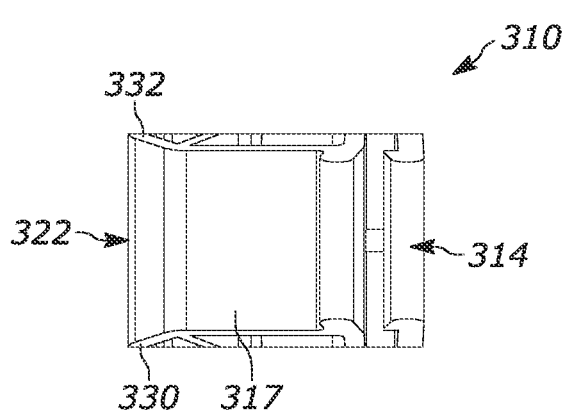
FIG. 20 is a bottom view of the ball stud track assembly of FIG. 16.
Figure 21:
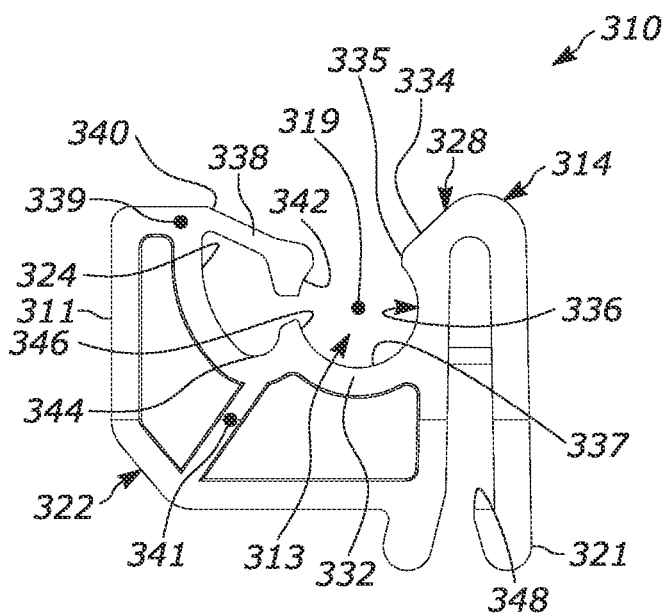
FIG. 21 is a side view of the ball stud track assembly of FIG. 16.
Figure 22:
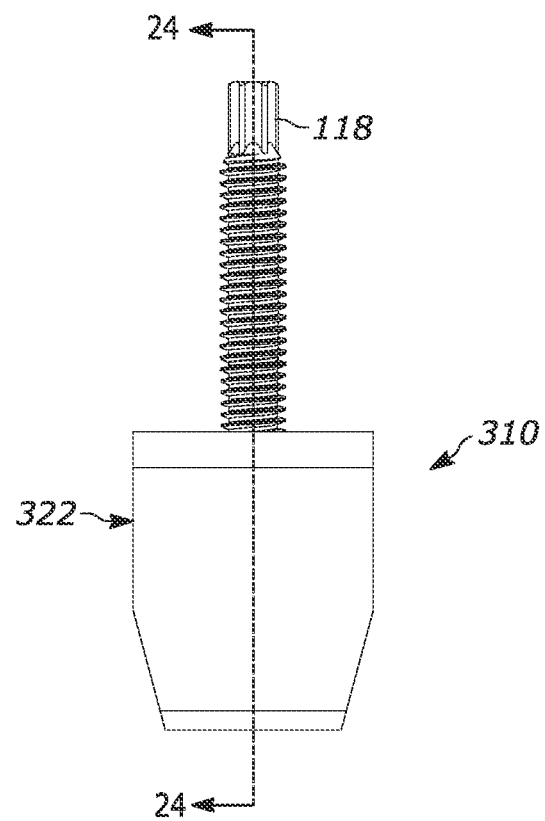
FIG. 22 is a front view of the ball stud track assembly of FIG. 16 shown coupled with the ball stud.
Figure 23:
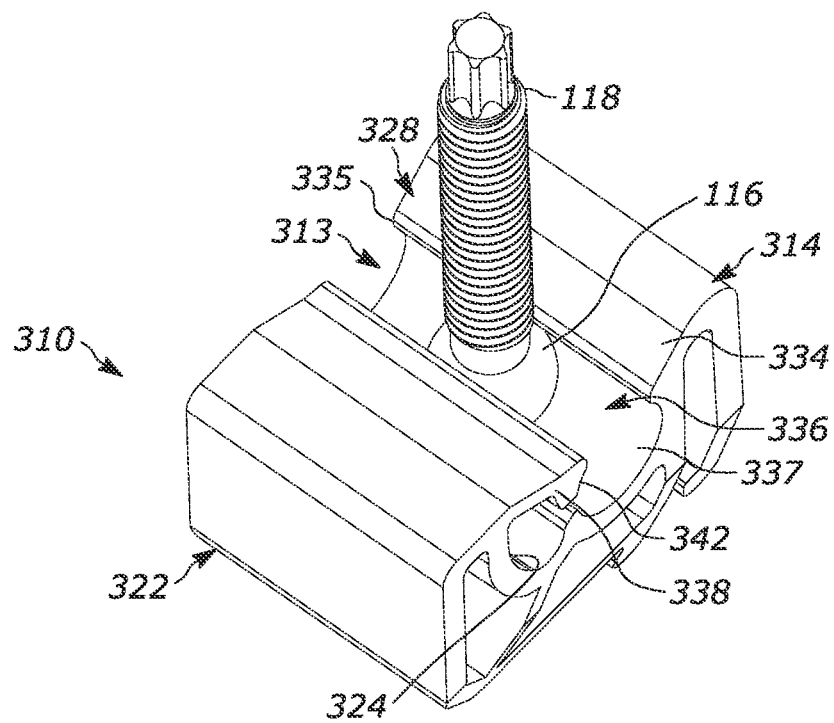
FIG. 23 is a top perspective view of the ball stud track assembly of FIG. 16 shown coupled with the ball stud.
Figure 24:
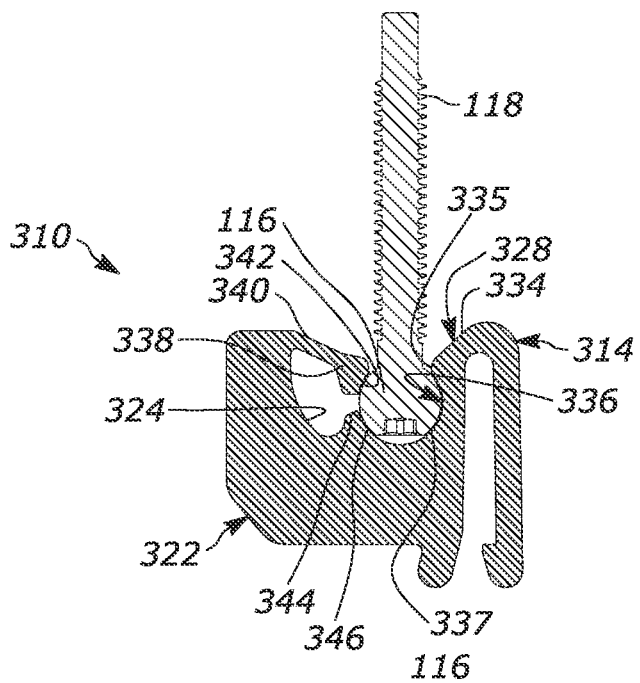
FIG. 24 is a cross-sectional side view of the ball stud track assembly of FIG. 16 shown coupled with the ball stud, taken generally along the line 24-24 of FIG. 22.

Referring to FIGS. 1 and 2, an exemplary embodiment of a ball stud track assembly 110 is shown that includes a base 122, having a ball track 112 and a connector portion 114. The ball track 112 includes a top 115, a bottom 117, and a ball channel 113 that is sized and shaped for receiving and securing a ball stud head 116 of a ball stud 118, while allowing sliding longitudinal movement of the ball stud head 116 along a central longitudinal ball channel axis 119 (FIG. 7), while restricting extraction of the ball stud head 116 from the ball channel 113. In FIG. 1, the ball stud track assembly 110 is shown with the ball stud head 116 of the ball stud 118 is secured within the ball channel 113, and the connector portion 114 secured to a complimentary mounting boss 120. The ball stud 118 is representative of a typical ball stud found in an adjuster mechanism (not shown) and the mounting boss 120 is representative of a receiving/engagement portion of a structure for securement of the ball stud track assembly 110, such as a portion of a headlamp reflector assembly (not shown). In at least some embodiments, engaging the ball stud track assembly 110 to the mounting boss 120 can provide a desired coupling between a reflector assembly and a vehicle portion to which the reflector assembly is adjustably mounted, wherein the ball stud track assembly 110 can be easily pre-mounted to a reflector assembly using the connector portion 114, and then the reflector assembly can be snapped into engagement with the ball stud of a pre-mounted adjuster assembly on a vehicle during final assembly. As seen in FIG. 2, a retention clip 121 may be secured to the connector portion 114 of the base 122 to assist with engagement, via interlock, with the mounting boss 120, although other and/or additional engagement elements can be utilized to assist with securement. Further, the connector portion 114 includes a clip chamber 123 sized and shaped to allow passage of the retention clip 121 therethrough, wherein the retention clip 121 is passed through a clip chamber aperture 125 and secured to a clip chamber bottom portion 127 via a fastener 129, such as a rivet. The retention clip 121 includes boss tabs 131 for engaging the mounting boss 120.

FIGS. 3-11 provide further exemplary views of the ball stud track assembly 110. The ball track 112 comprises a back inner sidewall 128, a front inner sidewall 124, an upper retaining arm 138, and a lower retaining arm 144. The upper retaining arm 138 includes an arm portion 140 that extends from the front inner sidewall 124 of the base 122, which terminates with an arm ridge 143 and an upper arm end portion surface 142 (which in at least some embodiments is curved to matingly receive a portion of the ball stud head), wherein the upper arm end portion surface 142 may serve as a first contact surface for the ball stud head 116 when installed in the ball track 112, as shown, in one instance, in FIG. 11. Opposite the front inner sidewall 124, is the back inner sidewall 128, having an upper portion 134 and a lower portion 136, the lower portion 136 having a lower portion top surface 137 that can serve as a second contact surface for the ball stud head 116. The upper portion 134 includes a retention ridge 135 situated about the junction of the lower portion 136 and the upper portion 134, which can serve to restrain an inserted ball stud head 116 within the ball channel 113.

In at least some embodiments, the lower retaining arm 144 extends from the lower portion 136 and curves to at least partially support the ball stud head 116 when the ball stud head 116 is inserted from the top 115 of the ball track towards the bottom 117 of the ball track into the ball channel 113. Further, the lower retaining arm 144 includes a lower arm top surface 146 that can serve as a third contact surface for the ball stud head 116, as shown, in one instance, in FIG. 11. These contact surfaces, namely the lower arm top surface 146, lower portion top surface 137, and upper arm end portion surface 142 form a longitudinal chamber identified herein as the ball channel 113. The central longitudinal ball channel axis 119 extends through the center point of these three contact surfaces.

In at least some embodiments, a trough 145 can be provided at the juncture between the lower portion top surface 137 and the lower arm top surface 146. The trough 145 can serve to extend, in part, the length of the lower retaining arm 144 and thereby provide an increased flex radius for the lower retaining arm 144. Although the trough 145 is not required, the increased flexibility can reduce the insertion force required when securing a ball stud head 116 within the ball track 112. The size and shape of the trough 145 can vary, and the trough 145 can further be sized and shaped to accommodate the insertion of various ball stud head 116 shapes. In at least a preferred embodiment, the trough 145 is V-shaped, while in other embodiments, it can be U-shaped, or otherwise include one or more other shapes. Further, in at least some embodiments, the opening of the trough 145 is at least as wide as the flat portion of the ball stud head 116. This can allow for the curved portions of the ball stud head 116 to be engaged by the ball channel 113, allowing for suitable longitudinal movement of the ball stud head 116 along the curved contact surfaces of the ball channel 113. This configuration thereby allows for longitudinal movement of the ball stud head 116 in the ball channel 113 while restricting movement of the ball stud head 116 along any axis perpendicular to the central longitudinal ball channel axis.

In at least some embodiments, the base 122 includes a first end wall 130 and a second end wall 132. Further, in at least some embodiments, the ball track 112 extends between the first end wall 130 and the second end wall 132, noting that the end walls 130, 132 can be comprised of one or more extents (i.e., the ends) of the ball track 112 components, as opposed to enclosing them via additional wall structure, while end walls in other embodiments can include wall structure that can at least partially enclose portions of the ball track 112, such as shown in the embodiment in FIGS.

27-37. In at least some embodiments, the lower retaining arm 144, the lower portion top surface 137, and the upper retaining arm 138 can extend to the first end wall 130 and the second end wall 132, although, in other embodiments they need not completely extend to the first and second end walls, but may rather extend adjacent to the first end wall 130 and the second end wall 132. Further, in at least some embodiments, only one of the lower retaining arm 144 and upper retaining arm 138 may extend to one or both of the first end wall 130 and the second end wall 132.

The ball channel 113 is configured to receive and secure (up to a critical pull-out force) a ball stud head 116 that is forcibly inserted thereon. The ball stud head 116 begins insertion into the ball channel 113 via abutment with the arm ridge 143 of the upper retaining arm 138, although as the upper portion 134 and the retention ridge 135 are fixed in position relative to the back inner sidewall 128, a force (similar to bending force 351, see FIG. 25) generally perpendicular to the arm portion 140 is created at a contact point of the ball stud head 116 and arm ridge 143 as it is inserted, causing a first bending moment of the upper retaining arm 138 about moment axis 139. As the upper retaining arm 138 is flexibly connected to the front inner sidewall 124 and can have a relatively thin wall thickness for the arm portion 140, the upper retaining arm 138 easily flexes under the insertion force applied to the ball stud head 116, causing the upper arm end portion surface 142 to move inward until the upper arm end portion surface 142 can sufficiently pass over the ball stud head 116 and rebound outward to a resting position over the ball stud head 116 as the ball stud head 116 abuts the lower portion top surface 137 and the lower arm top surface 146, thereby securing the ball stud head 116 within the ball channel 113.

Once fully inserted, the upper retaining arm 138 serves to resist pull-out of the ball stud head 116, but if a pull-out force is exerted on the ball stud head 116 to pull it back out in the direction it was inserted, the ball stud head 116 must follow along the lower portion top surface 137 and around the retention ridge 135, the resulting directional movement of the ball stud head 116 pushes into the upper arm end portion surface 142, preventing (or in at least some embodiments substantially preventing) it from flexing away from the ball stud head 116 and creating a compressive force (see FIG. 26, similar to compressive force 353) in the general longitudinal direction of the arm portion 140, this compressive force is applied in a direction towards the top 115, which pressures the front inner sidewall 124 and the upper retaining arm 138 to flex outward and away from the retention ridge 135, creating a bending moment generally about a second moment axis 141. However, the flexing from this bending moment is greatly resisted due to the thicker rigid C-shaped frame-like structure from the top 115 to the lower portion 136 that is the thickness created between the front outer sidewall 111, the front inner sidewall 124, bottom 117 and lower portion 136. Since both the upper arm end portion surface 142 and front inner sidewall 124 are substantially prevented from flexing, a high pull out resistance of the ball stud head 116 is achieved. Noting the moment axes in this embodiment, as well as other embodiments are represented with a point in the FIGS., they extend through the ball track between the end walls. In contrast to the prior art, the design allows for enhanced rigidity of the upper retaining arm 138, which serves to increase the pull-out force required while allowing sufficient flex for insertion.

Another exemplary embodiment of a ball stud track assembly 210 is shown in FIGS. 12-15. The ball stud track assembly 210 includes a base 222 with a ball track 212 and a connector portion 214. The ball track 212 has the same configuration as the ball track 112 of the previously described embodiment including a top 215, a bottom 217, and a ball channel 213. However, the connector portion 214 differs in that it is substantially planar and shaped to rest on a complimentary mounting boss 220 and be secured thereto via a fastener 221 (e.g., a screw) through an aperture 223. In at least some embodiments and as shown, the connector portion 214 and/or mounting boss 220 can be circular, while in other embodiments, they can include various other or additional shapes, sizes, and mating surfaces. Similar to ball track 112, ball track 212 includes a back inner sidewall 228, a front inner sidewall 224, an upper retaining arm 238, and a lower retaining arm 244. The upper retaining arm 238 includes an arm portion 240 that extends from the front inner sidewall 224 of the base 222, which terminates with an arm ridge 243 and an upper arm end portion surface 242 (which in at least some embodiments is curved to matingly receive a portion of the ball stud head), wherein the upper arm end portion surface 242 may serve as a first contact surface for the ball stud head 116, as shown, in one instance, in FIG. 13. Opposite the front inner sidewall 224, is the back inner sidewall 228, having an upper portion 234 and a lower portion 236, the lower portion 236 having a lower portion top surface 237 that can serve as a second contact surface for the ball stud head 116. The upper portion 234 further includes a retention ridge 235 situated about the junction of the lower portion 236 and the upper portion 234, which can serve to restrain an inserted ball stud head 116 within the ball channel 213.

In at least some embodiments, the lower retaining arm 244 extends from the lower portion 236 and curves to at least partially support the ball stud head 116 when the ball stud head 116 is inserted from the top 215 of the ball track towards the bottom 217 of the ball track into the ball channel 213. Further, the lower retaining arm 244 includes a lower arm top surface 246 that can serve as a third contact surface for the ball stud head 116, as shown, in one instance, in FIG. 13. These contact surfaces, namely the lower arm top surface 246, the lower portion top surface 237, and the upper arm end portion surface 242 form a longitudinal chamber identified herein as the ball channel 213. A central longitudinal ball channel axis 219 extends through the center point of these three contact surfaces. Insertion, retention, and removal of the ball stud head 116 from the ball channel 213 is the same as described above with reference to ball channel 113. More particularly, the upper retaining arm 238 flexes downward and inward bending about the moment axis 239 during insertion of the ball stud head 116 as the ball stud head 116 abuts the arm ridge 243, and once fully inserted, the upper retaining arm 238 serves to resist pull-out of the ball stud head 116, but if a pull-out force is exerted on the ball stud head 116 to pull it back out in the direction it was inserted, the ball stud head 116 must follow along the lower portion top surface 237 and around the retention ridge 235, the resulting directional movement of the ball stud head 116 pushes into the upper arm end portion surface 242, preventing (or in at least some embodiments substantially preventing) it from flexing away from the ball stud head 116 and creating a compressive force (similar to compressive force 353, see FIG. 26) in the general longitudinal direction of the arm portion 240. This compressive force is applied in a direction towards the top 215, which pressures the front inner sidewall 224 and the upper retaining arm 238 to flex outward and away from the retention ridge 235, creating a bending moment generally about a second moment axis 241. However, the flexing from this bending moment is greatly resisted due to the thicker rigid C-shaped frame-like structure from the top 215 to the lower portion 236 that is the thickness created between the front outer sidewall 211, the front inner sidewall 224, bottom 217 and lower portion 236. Since both the upper arm end portion surface 242 and front inner sidewall 224 are substantially prevented from flexing, a high pull out resistance of the ball stud head 116 is achieved. Similar to ball track 112, in at least some embodiments, a trough 245 can be provided at the juncture between the lower portion top surface 237 and the lower arm top surface 246.

In at least some embodiments, the base 222 can include a first end wall 230 and a second end wall 232. Further, in at least some embodiments, the ball track 212 extends between the first end wall 230 and the second end wall 232, noting that the end walls 230, 232 can be comprised of one or more extents (i.e., the ends) of the ball track 212 components, as opposed to enclosing them via additional wall structure, while end walls in other embodiments can include wall structure that can at least partially enclose portions of the ball track 212, such as shown in the embodiment in FIGS. 27-37. In at least some embodiments, the lower retaining arm 244, the lower portion top surface 237, and the upper retaining arm 238 can extend to the first end wall 230 and the second end wall 232, although, in other embodiments they need not completely extend to the first and second end walls, but may rather extend adjacent to the first end wall 230 and the second end wall 232. Further, in at least some embodiments, only one of the lower retaining arm 244 and upper retaining arm 238 may extend to one or both of the first end wall 230 and the second end wall 232.

Still another exemplary embodiment of a ball stud track assembly 310 is shown in FIGS. 16-26, wherein the ball stud track assembly 310 includes a base 322 having a ball track 312 and a connector portion 314. In this embodiment, the base 322 is connectable to a complimentary mounting boss 320 in a snap-fit manner via the connector portion 314. The connector portion 314 including a retention clip 321 with a latch portion 348, which can extend over the mounting boss 320 and snap securably thereto. As shown, the mounting boss 320 includes mating geometry in the form of an exemplary planar U-shape, although in other embodiments, the connector portion 314 can vary along with the mounting boss 320 to form a mating connection.

Similar to ball tracks 112 and 212, ball track 312 includes a top 315, a bottom 317, a back inner sidewall 328, a front inner sidewall 324, an upper retaining arm 338, and a lower retaining arm 344. The upper retaining arm 338 includes an arm portion 340 that extends from the front inner sidewall 324 of the base 322, which terminates with an arm ridge 343 and an upper arm end portion surface 342 (which in at least some embodiments is curved to matingly receive a portion of the ball stud head), wherein the upper arm end portion surface 342 may serve as a first contact surface for the ball stud head 116 when installed in the ball track 312. Opposite the front inner sidewall 324, is the back inner sidewall 328, having an upper portion 334 and a lower portion 336, the lower portion 336 having a lower portion top surface 337 that can serve as a second contact surface for the ball stud head 116. The upper portion 334 further includes a retention ridge 335 situated about the junction of the lower portion 336 and the upper portion 334, which can serve to restrain an inserted ball stud head 116 within a ball channel 313.

In at least some embodiments, the lower retaining arm 344 extends from the lower portion 336 and curves to at least partially support the ball stud head 116 when the ball stud head 116 is inserted from the top 315 of the ball track towards the bottom 317 of the ball track into the ball channel 313. Further, the lower retaining arm 344 includes a lower arm top surface 346 that can serve as a third contact surface for the ball stud head 116. These contact surfaces, namely the lower arm top surface 346, the lower portion top surface 337, and the upper arm end portion surface 342, form a longitudinal chamber identified herein as the ball channel 313. A central longitudinal ball channel axis 319 extends through the center point of these three contact surfaces.

The ball track 312 is configured somewhat similar to the ball track 112 of the first embodiment, with the noted exception that there is no trough 145. Rather, in this embodiment, the lower arm top surface 346 forms a continuous curve with the lower portion top surface 337. As such, the lower retaining arm 344 is shorter, providing less flex during insertion of the ball stud head 116 as the ball stud head 116 abuts the arm ridge 343, but providing a higher rigidity for retention once the ball stud head 116 is fully inserted.

In at least some embodiments, the base 322 can include a first end wall 330 and a second end wall 332. Further, in at least some embodiments, the ball track 312 extends between the first end wall 330 and the second end wall 332, noting that the end walls 330, 332 can be comprised of one or more extents (i.e., the ends) of the ball track 312 components, as opposed to enclosing them via additional wall structure, while end walls in other embodiments can include wall structure that can at least partially enclose portions of the ball track 312, such as shown in the embodiment in FIGS. 27-37. In at least some embodiments, the lower retaining arm 344, the lower portion top surface 337, and the upper retaining arm 338 can extend to the first end wall 330 and the second end wall 332, although, in other embodiments they need not completely extend to the first and second end walls, but may rather extend adjacent to the first end wall 330 and the second end wall 332. Further, in at least some embodiments, only one of the lower retaining arm 344 and upper retaining arm 338 may extend to one or both of the first end wall 330 and the second end wall 332.

Figure 25:
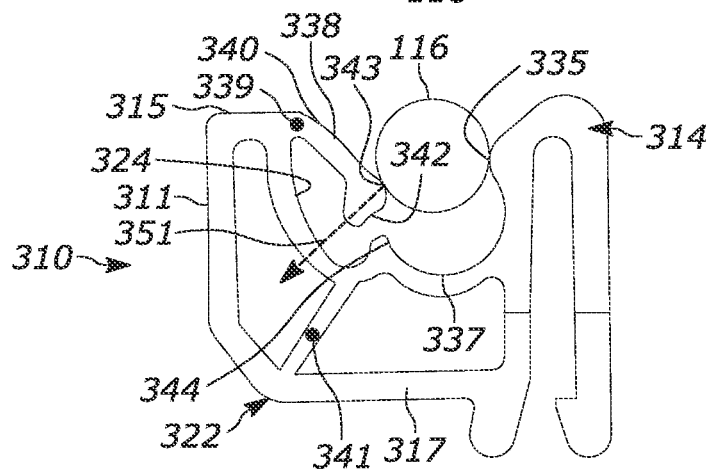
FIG. 25 is a side view of the ball stud track assembly of FIG. 16 shown during insertion of the ball stud head of the ball stud.
Figure 26:
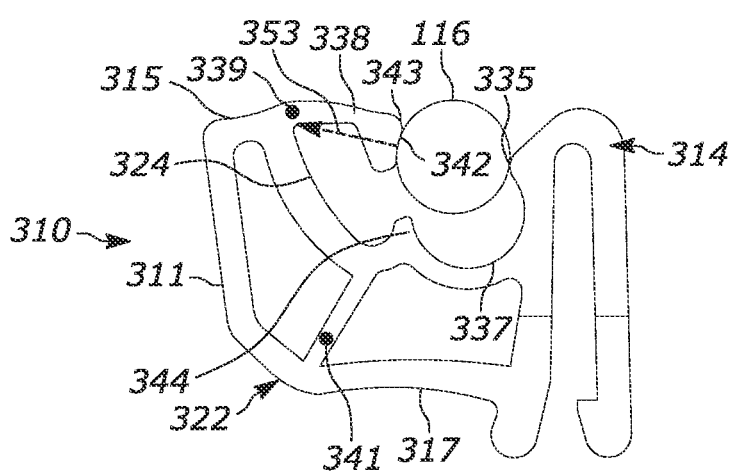
FIG. 26 is a side view of the ball stud track assembly of FIG. 16 shown during pull-out of the ball stud head.
Figure 27:
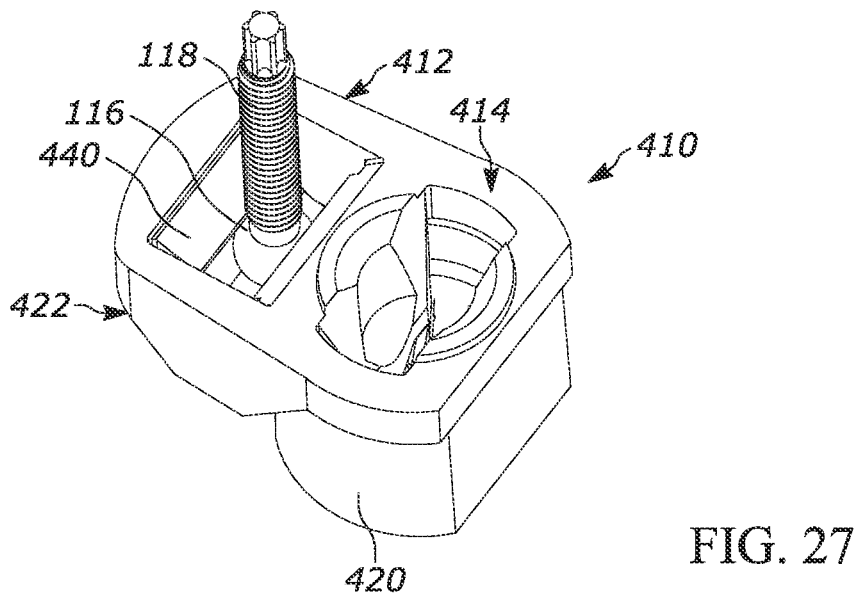
FIG. 27 is a top perspective view of yet a further additional exemplary embodiment of a ball stud track assembly shown coupled with a ball stud and a mounting boss.
Figure 28:
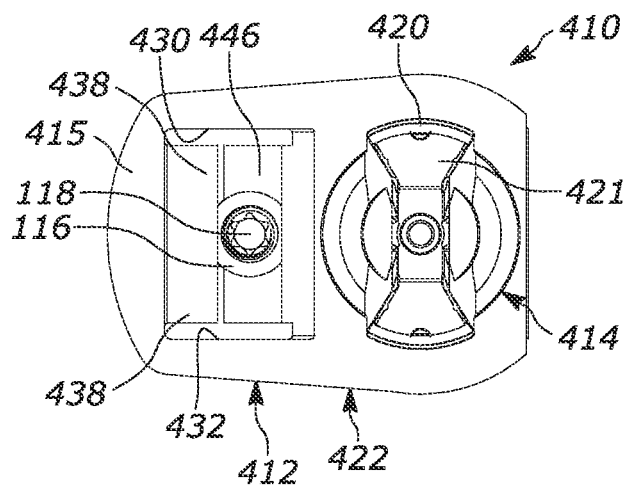
FIG. 28 is a top view of the ball stud track assembly of FIG. 27 shown coupled with the ball stud and including a clip secured with the mounting boss.
Figure 29:
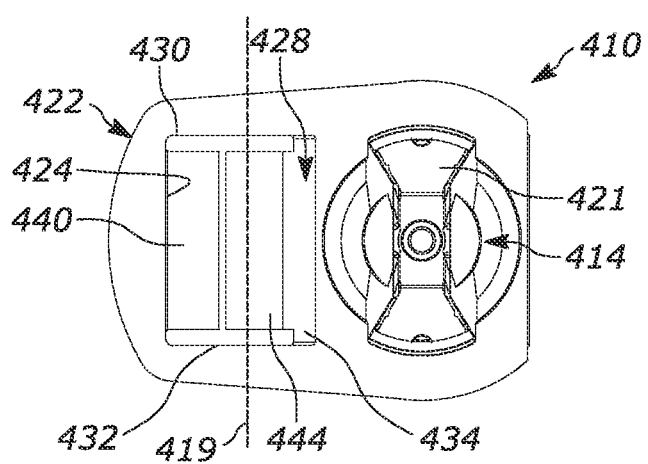
FIG. 29 is a top view of the ball stud track assembly of FIG. 27.
Figure 30:
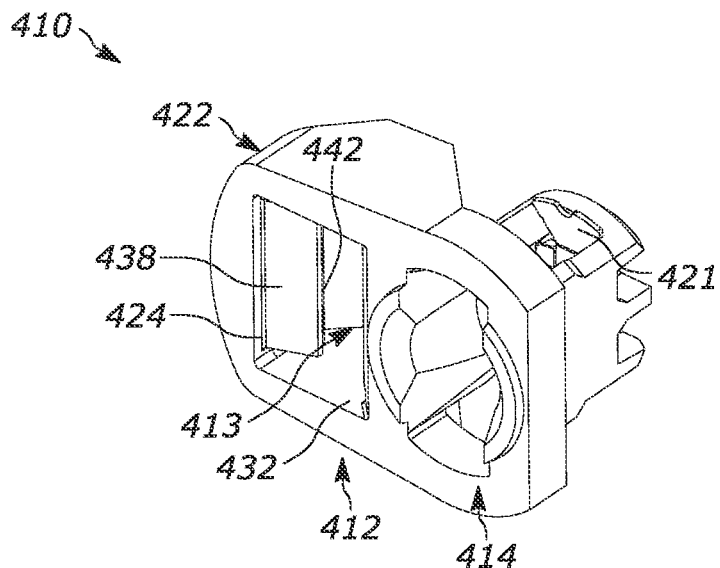
FIG. 30 is a side perspective view of the ball stud track assembly of FIG. 27.
Figure 31:
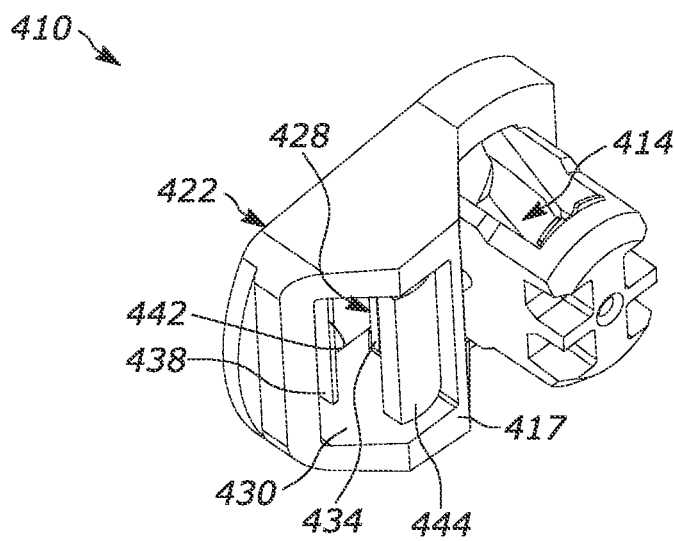
FIG. 31 is a bottom perspective view of the ball stud track assembly of FIG. 27.
Figure 32:
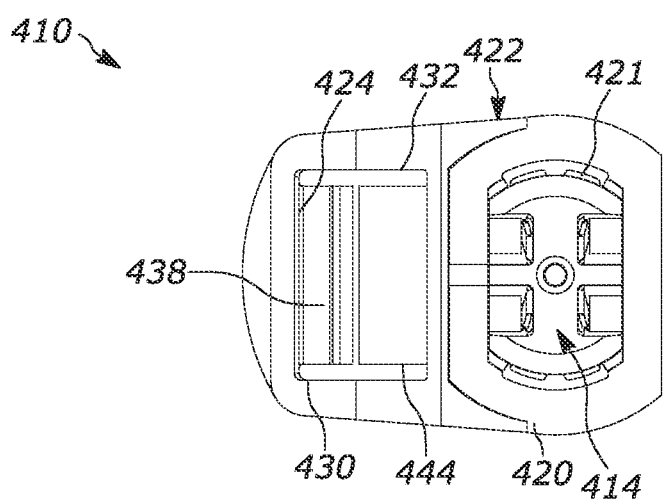
FIG. 32 is a bottom view of the ball stud track assembly of FIG. 27 shown with the mounting boss.
Figure 33:
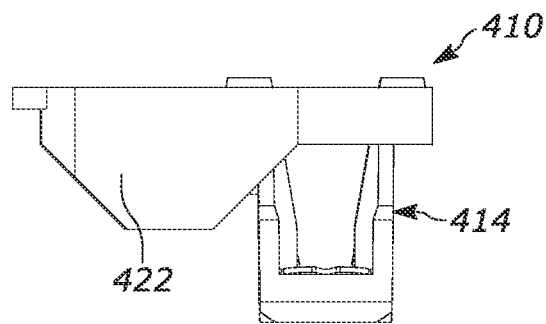
FIG. 33 is a side view of the ball stud track assembly of FIG. 27.
Figure 34:
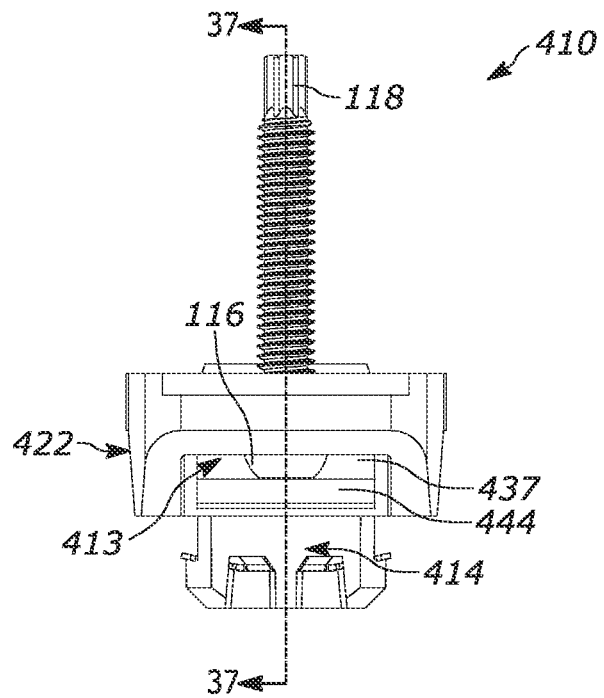
FIG. 34 is a front view of the ball stud track assembly of FIG. 27 shown coupled with the ball stud.
Figure 35:
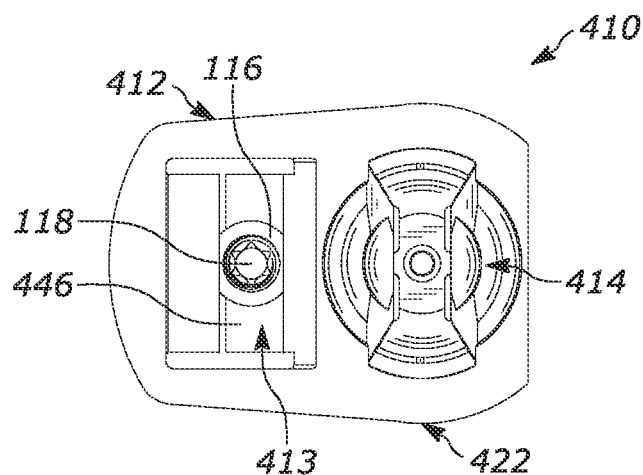
FIG. 35 is a top view of the ball stud track assembly of FIG. 27 shown coupled with the ball stud.
Figure 36:
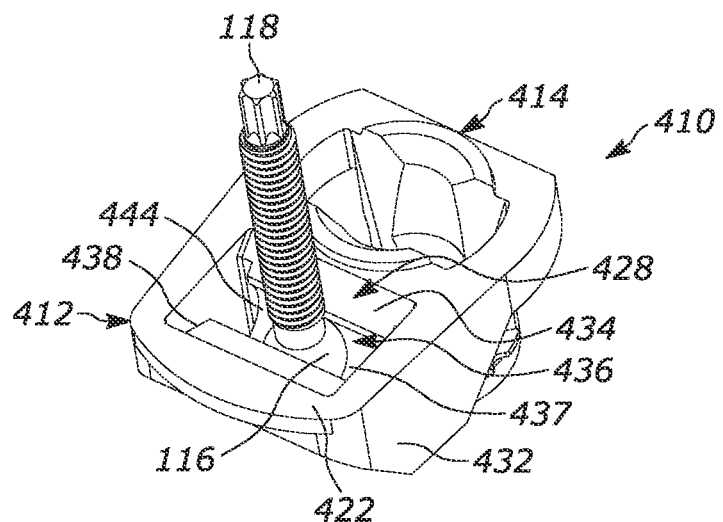
FIG. 36 is a top perspective view of the ball stud track assembly of FIG. 27 shown coupled with the ball stud.
Figure 37:
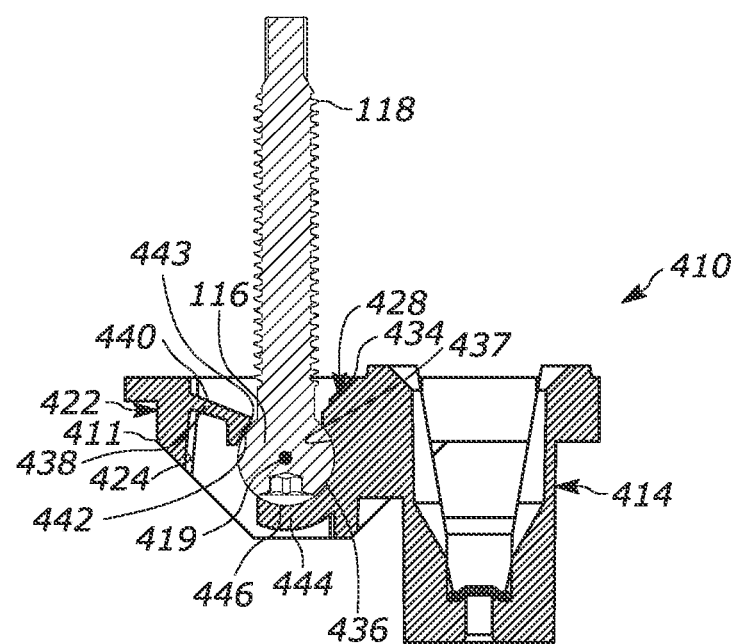
FIG. 37 is a cross-sectional side view of the ball stud track assembly of FIG. 27 shown coupled with the ball stud, taken generally along the line 37-37 of FIG. 34.
Figure 38:
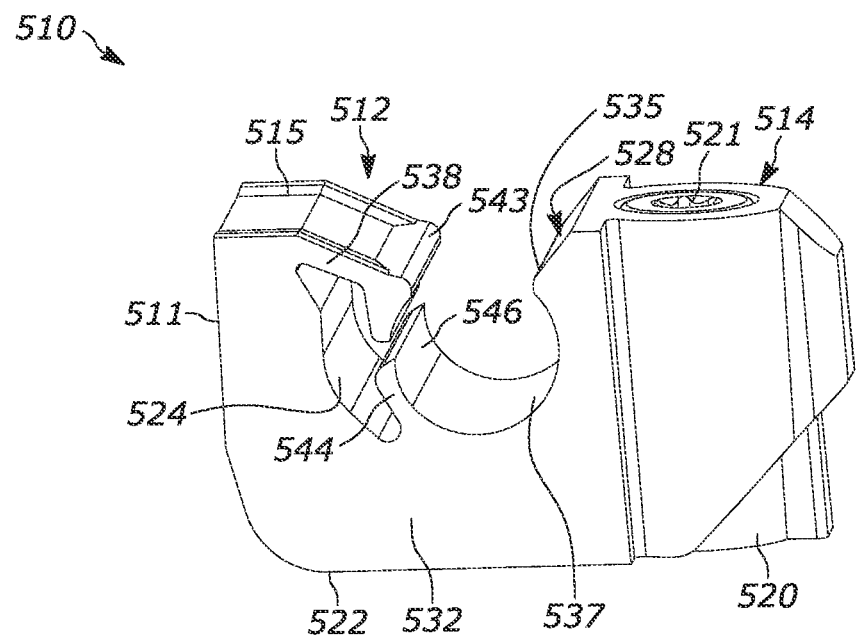
FIG. 38 is a top perspective view of a still further additional exemplary embodiment of a ball stud track assembly shown coupled with a ball stud and a mounting boss.
Figure 39:
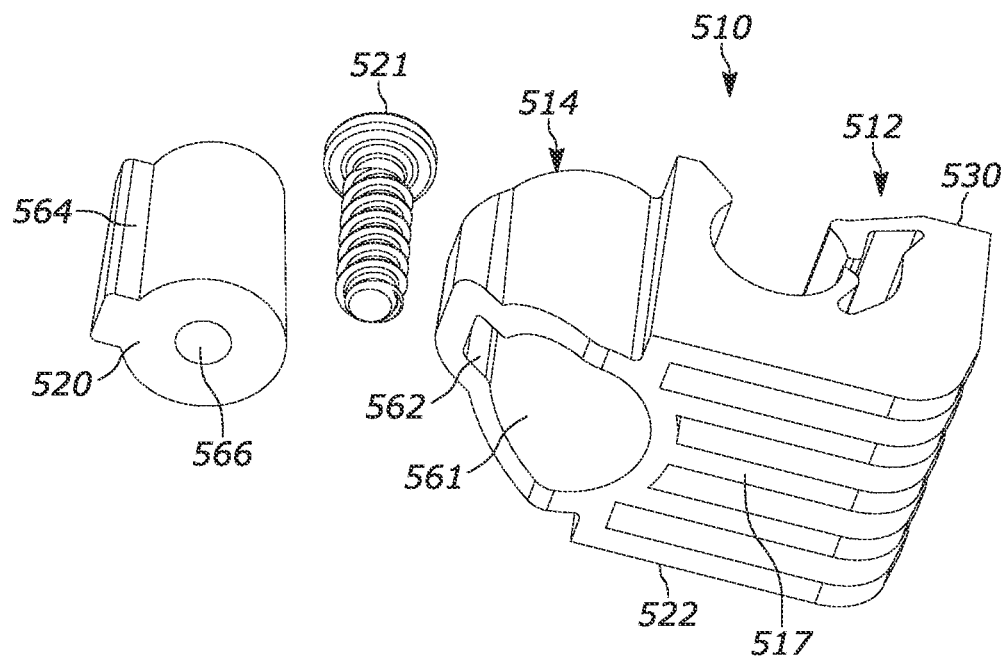
FIG. 39 is an exploded bottom perspective view of the ball stud track assembly, ball stud, and a mounting boss of FIG. 38.
Figure 40:
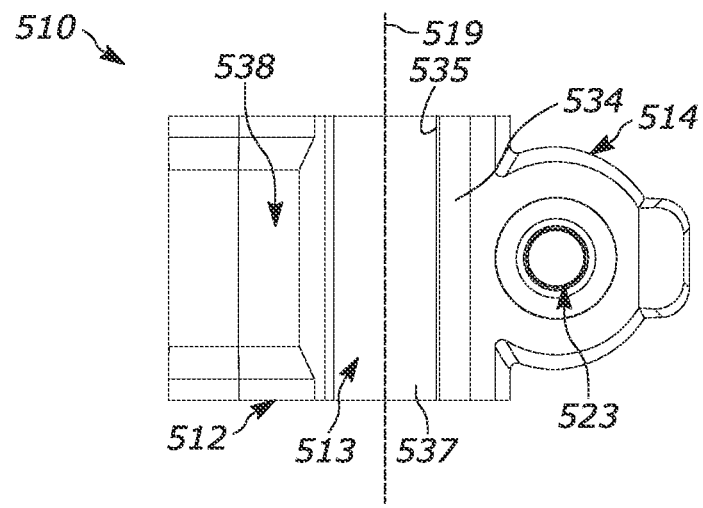
FIG. 40 a top view of the ball stud track assembly of FIG. 38.
Figure 41:
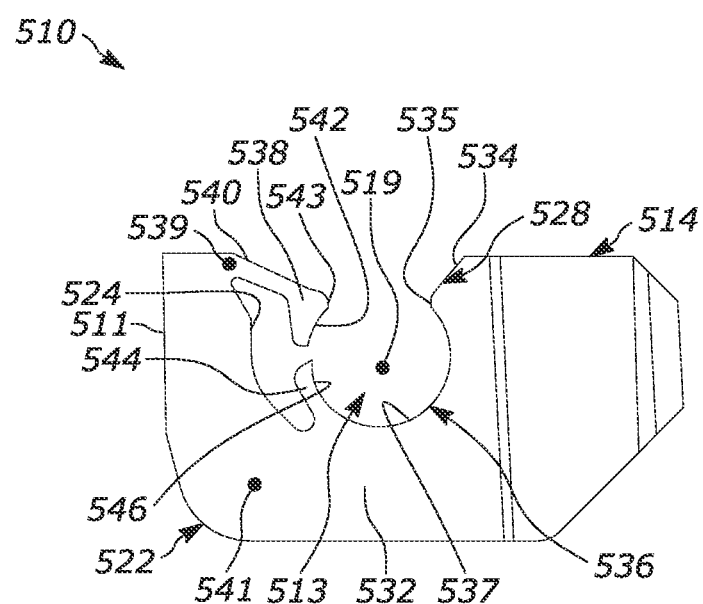
FIG. 41 is a side view of the ball stud track assembly of FIG. 38.

FIGS. 16, 17, and 22-24 show the ball stud track assembly 310 after the ball stud head 116 has been fully inserted within the ball channel 313, while FIGS. 25 and 26 respectively illustrate the ball track 312 in state of flex that occurs during insertion and removal of the ball stud head 116 from the ball channel 313. For illustration purposes only, in FIGS. 24 and 25 the ball stud head 116 is representatively drawn as a circle. Referring to FIG. 25, the ball stud head 116 is inserted into the ball channel 313 via forceful inward directed abutment with the upper retaining arm 338 and the upper portion 334, although the upper portion 334, as well as the retention ridge 335, are fixed in position relative to the back inner sidewall 328, the upper retaining arm 338 is flexibly connected to the front inner sidewall 324 and therefore flexes under the insertion force applied by the ball stud head 116, causing the upper arm end portion surface 342 to move inward until the upper arm end portion surface 342 can pass over the ball stud head 116 and rebound outward to a resting position over the ball stud head 116 as the ball stud head 116 abuts the lower portion top surface 337 and the lower arm top surface 346, thereby securing the ball stud head 116 within the ball channel 313. Noting that FIG. 25 illustrates the position of the inward flexed upper retaining arm 338 just before it passes over the ball stud head 116 and returns to its static position.

Referring to FIG. 26, once fully inserted, the upper retaining arm 338 serves to resist pull-out of the ball stud head 116, but if sufficient (critical) pull-out force is exerted on the ball stud head 116 in a generally outward direction, the ball stud head 116 imparts force on the upper retaining arm 338 and the lower retaining arm 344, which causes the front inner sidewall 324, the upper retaining arm 338, and the lower retaining arm 344 to flex outward and away from the retention ridge 335, thereby releasing the ball stud head 116 from the ball channel 313. Note that the rigidity and inward angle of the upper retaining arm 338 serves to resist pull-out of the ball stud head 116, while allowing flexing during insertion. Similar to the ball tracks 112 and 212, the upper retaining arm 338 flexes downward and inward bending about the moment axis 329 during insertion of the ball stud head 116, and once fully inserted, the upper retaining arm 338 serves to resist pull-out of the ball stud head 116, but if a pull-out force is exerted on the ball stud head 116 to pull it back out in the direction it was inserted, the ball stud head 116 must follow along the lower portion top surface 337 and around the retention ridge 335, the resulting directional movement of the ball stud head 116 pushes into the upper arm end portion surface 342, preventing (or in at least some embodiments substantially preventing) it from flexing away from the ball stud head 116 and creating a compressive force 353 in the general longitudinal direction of the arm portion 340, this compressive force is applied in a direction towards the top 315, which pressures the front inner sidewall 324 and the upper retaining arm 338 to flex outward and away from the retention ridge 335, creating a bending moment generally about a second moment axis 341. However, the flexing from this bending moment is greatly resisted due to the thicker rigid C-shaped frame-like structure from the top 315 to the lower portion 336 that is the thickness created between the front outer sidewall 311, the front inner sidewall 324, bottom 317 and lower portion 336. Since both the upper arm end portion surface 342 and front inner sidewall 324 are substantially prevented from flexing, a high pull out resistance of the ball stud head 116 is achieved.

A further additional exemplary embodiment of a ball stud track assembly 410 is shown in FIGS. 27-37, wherein the ball stud track assembly 410 includes a base 422 having a ball track 412 and a connector portion 414. The connector portion 414 and mounting boss 420 shown are similar to the connector portion 114 and the mounting boss 120 shown in FIG. 1. However, the ball track 412 is configured differently from the ball track 112. A retention clip 121 may be secured to the connector portion 414 of the base 422 to assist with engagement, via interlock, with the complimentary mounting boss 420, although other and/or additional engagement elements can be utilized to assist with securement.

The ball track 412 includes a top 415, a bottom 417, a back inner sidewall 428, a front inner sidewall 424, an upper retaining arm 438, and a lower retaining arm 444. The upper retaining arm 438 includes an arm portion 440 that extends from the front inner sidewall 424 of the base 422, which terminates with an arm ridge 443 and an upper arm end portion surface 442 (which in at least some embodiments is curved to matingly receive a portion of the ball stud head), wherein the upper arm end portion surface 442 may serve as a first contact surface for the ball stud head 116. Opposite the front inner sidewall 424, is the back inner sidewall 428, having an upper portion 434 and a lower portion 436, the lower portion 436 having a lower portion top surface 437 that can serve as a second contact surface for the ball stud head 116. The upper portion 434 further includes a retention ridge 435 situated about the junction of the lower portion 436 and the upper portion 434, which can serve to restrain an inserted ball stud head 116 within a ball channel 413.

In at least some embodiments, the lower retaining arm 444 extends from the lower portion 436 and curves to at least partially support the ball stud head 116 when the ball stud head 116 is inserted from the top 415 of the ball track towards the bottom 417 of the ball track into the ball channel 413. Further, the lower retaining arm 444 includes a lower arm top surface 446 that can serve as a third contact surface for the ball stud head 116. These contact surfaces, namely the lower arm top surface 446, the lower portion top surface 437, and the upper arm end portion surface 442, form a longitudinal chamber identified herein as the ball channel 413. A central longitudinal ball channel axis 419 extends through the center point of these three contact surfaces.

The base 422 can include a first end wall 430 and a second end wall 432. In at least some embodiments, both sides of the ball track 412 are enclosed by the first end wall 430 and the second end wall 432, wherein the aforementioned exemplary embodiments included extents that were not enclosed. Although in the earlier aforementioned ball track embodiments (e.g., ball tracks 112, 212, 312) a lower retaining arm, upper retaining arm and lower portion top surface each extended to their respective end walls, in the ball track 412, the lower retaining arm 444, upper retaining arm 438 and the lower portion top surface 437 each stop before the end walls 430, 432. This allows for these components to flex during insertion of the ball stud head 116, whereas rigid securement to the ball track encompassing end walls 430, 432 would extensively limit flexing during installation of ball stud head 116 and can result in breakage during the installation as well as potential breakage due to vibration when in use in a vehicle.

For insertion, the ball stud head 116 is inserted into the ball channel 413 via forceful inward directed abutment with the upper retaining arm 438 and the upper portion 434, although the upper portion 434, as well as the retention ridge 435, are fixed in position relative to the back inner sidewall 428, the upper retaining arm 438 is flexibly connected to the front inner sidewall 424 and therefore flexes under the insertion force applied by the ball stud head 116, causing the upper arm end portion surface 442 to move inward until the upper arm end portion surface 442 can pass over the ball stud head 116 and rebound outward to a resting position over the ball stud head 116 as the ball stud head 116 abuts the lower portion top surface 437 and the lower arm top surface 446, thereby securing the ball stud head 116 within the ball channel 413.

A still further additional exemplary embodiment of a ball stud track assembly 510 is shown in FIGS. 38-41, wherein the ball stud track assembly 510 includes a base 522 having a ball track 512 and a connector portion 514. The connector portion 514 is configured with a boss chamber 561 (see FIG. 39), which in at least some embodiments, includes an elongated notch portion 562. A complimentary mounting boss 520 includes an at least partially cylindrical shape and in at least some embodiments, includes a longitudinal wedge 564 that is matingly received in the notch portion 562 to prevent rotation of the ball stud track assembly 510. An exemplary fastener 521, such as a screw or rivet is passed through an aperture 523 in the connector portion 514 and is secured to a passage 566 in the mounting boss 520, although other securing methods can be utilized.

Similar to ball track 312, ball track 512 includes a top 515, a bottom 517, a back inner sidewall 528, a front inner sidewall 524, an upper retaining arm 538, and a lower retaining arm 544. The upper retaining arm 538 includes an arm portion 540 that extends from the front inner sidewall 524 of the base 522, which terminates with an arm ridge 543 and an upper arm end portion surface 542 (which in at least some embodiments is curved to matingly receive a portion of the ball stud head), wherein the upper arm end portion surface 542 may serve as a first contact surface for the ball stud head 116. Opposite the front inner sidewall 524, is the back inner sidewall 528 having an upper portion 534 and a lower portion 536, the lower portion 536 having a lower portion top surface 537 that can serve as a second contact surface for the ball stud head 116. The upper portion 534 further includes a retention ridge 535 situated about the junction of the lower portion 536 and the upper portion 534, which can serve to restrain an inserted ball stud head 116 within a ball channel 513.

In at least some embodiments, the lower retaining arm 544 extends from the lower portion 536 and curves to at least partially support the ball stud head 116 when the ball stud head 116 is inserted from the top 515 of the ball track towards the bottom 517 of the ball track into the ball channel 513. Further, the lower retaining arm 544 includes a lower arm top surface 546 that can serve as a third contact surface for the ball stud head 116. These contact surfaces, namely the lower arm top surface 546, the lower portion top surface 537, and the upper arm end portion surface 542, form a longitudinal chamber identified herein as the ball channel 513. A central longitudinal ball channel axis 519 extends through the center point of these three contact surfaces.

In at least some embodiments, the base 522 can include a first end wall 530 and a second end wall 532. Further, in at least some embodiments, the ball track 512 extends between the first end wall 530 and the second end wall 532, noting that the end walls 530, 532 can be comprised of one or more extents (i.e., the ends) of the ball track 512 components, as opposed to enclosing them via additional wall structure, while end walls in other embodiments can include wall structure that can at least partially enclose portions of the ball track 512, such as shown in the embodiment in FIGS. 27-37. In at least some embodiments, the lower retaining arm 544, the lower portion top surface 537, and the upper retaining arm 538 can extend to the first end wall 530 and the second end wall 532, although, in other embodiments they need not completely extend to the first and second end walls, but may rather extend adjacent to the first end wall 530 and the second end wall 532. Further, in at least some embodiments, only one of the lower retaining arm 544 and upper retaining arm 538 may extend to one or both of the first end wall 530 and the second end wall 532.

Although FIGS. 38-41 do not show the ball stud 118 installed in the ball channel 513, insertion, positioning, securement, and retraction (pull-out) of the ball stud head 116 are all similar to the ball track 312. More particularly, the ball stud head 116 is inserted into the ball channel 513 via forceful inward directed abutment with the upper retaining arm 538 and the upper portion 534, although the upper portion 534, as well as the retention ridge 535, are fixed in position relative to the back inner sidewall 528, the upper retaining arm 538 is flexibly connected to the front inner sidewall 524 and therefore flexes under the insertion force applied by the ball stud head 116, causing the upper arm end portion surface 542 to move inward until the upper arm end portion surface 542 can pass over the ball stud head 116 and rebound outward to a resting position over the ball stud head 116 as the ball stud head 116 abuts the lower portion top surface 537 and the lower arm top surface 546, thereby securing the ball stud head 116 within the ball channel 513. Further, once the ball stud head 116 is fully inserted, the upper retaining arm 538 serves to resist pull-out of the ball stud head 116, but if sufficient (critical) pull-out force is exerted on the ball stud head 116 in a generally outward direction, the ball stud head 116 imparts force on the upper retaining arm 538 and the lower retaining arm 544, which causes the front inner sidewall 524, the upper retaining arm 538, and the lower retaining arm 544 to flex outward and away from the retention ridge 535, thereby releasing the ball stud head 116 from the ball channel 513.

Similar to the ball tracks 112, 212, and 312, the upper arm 538 flexes downward and inward bending about the moment axis 529 during insertion of the ball stud head 116, and once fully inserted, the upper retaining arm 538 serves to resist pull-out of the ball stud head 116, but if a pull-out force is exerted on the ball stud head 116 to pull it back out in the direction it was inserted, the ball stud head 116 must follow along the lower portion top surface 537 and around the retention ridge 535, the resulting directional movement of the ball stud head 116 pushes into the upper arm end portion surface 542, preventing (or in at least some embodiments substantially preventing) it from flexing away from the ball stud head 116 and creating a compressive force (similar to compressive force 353, see FIG. 26) in the general longitudinal direction of the arm portion 540, this compressive force is applied in a direction towards the top 515, which pressures the front inner sidewall 524 and the upper retaining arm 538 to flex outward and away from the retention ridge inner side 535, creating a bending moment generally about a second moment axis 541. However, the flexing from this bending moment is greatly resisted due to the thicker rigid C-shaped frame-like structure from the top 515 to the lower portion 536 that is the thickness created between the front outer sidewall 511, the front inner sidewall 524, bottom 517 and lower portion 536. Since both the upper arm end portion surface 542 and front inner sidewall 524 are substantially prevented from flexing, a high pull out resistance of the ball stud head 116 is achieved.

Each of the aforementioned ball tracks includes a ball channel that is sized and shaped for receiving and securing a ball stud head 116 of a ball stud 118, while allowing sliding longitudinal movement of the ball stud head 116 along a central longitudinal ball channel axis, and while restricting extraction of the ball stud head 116 from the ball channel. As is true for all the aforementioned embodiments, each ball stud track assembly provides a high extraction force requirement for an installed ball stud head, such that the ball stud head is securely retained by the ball stud track assembly, yet is allowed to pivot and slide longitudinally inside the ball channel along a central longitudinal ball channel axis, and be removed without damaging the ball stud track assembly. Further, it is noted that in the aforementioned embodiments, the connector portions are situated next to the ball track, not at the top or bottom, such that any fastener used to secure the connector portion to a mounting boss would be situated to the side of the ball track and not directly below the ball channel or an installed ball stud head 116.

The specific materials, shapes, and sizes of components can vary. For example, the ball stud track assembly can be integrally molded from a single piece of plastic, the upper and lower retaining arms can have varying thicknesses and be straight, curved, corrugated, etc. As can be understood, varying any of the thickness, length, and material composition of various components, such as the upper retaining arm, in any embodiment, allows for a designer to select an increased or decreased insertion and pull-out force requirement. In addition, the ball channel can vary in length, width, etc. Further, the rigidity of the upper and lower retaining arms can be the same or different, as desired.

As noted above, ball joints are commonly used with adjuster mechanisms to secure automotive lamp assemblies to a vehicle. The ball stud 118 is representative of a typical ball stud found in an adjuster mechanism (not shown) and the various mounting bosses referred to herein are representative of a receiving/engagement portion of a structure, such as a portion of a headlamp reflector assembly (not shown), for securement of any of the aforementioned ball stud track assemblies. In at least some embodiments, engaging a ball stud track assembly to a mounting boss can provide a desired coupling between a reflector assembly and a vehicle portion to which the reflector assembly is adjustably mounted, wherein the ball stud track assembly can be easily pre-mounted to a reflector assembly using the connector portion, and then the reflector assembly can be snapped into engagement with the ball stud of a pre-mounted adjuster assembly on a vehicle during final assembly.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A ball stud track assembly comprising:
   a base having a ball track integrally formed with a connector portion, the ball track comprising:
   a front inner sidewall positioned opposite a back inner sidewall, wherein the back inner sidewall includes a lower portion having a lower portion top surface, and an upper portion having a retention ridge fixed in position relative to the back inner sidewall;
   a single upper retaining arm, the upper retaining arm extending from the front inner sidewall and terminating at an upper arm end portion surface; and
   a single lower retaining arm, the lower retaining arm extending from the lower portion of the back inner sidewall and having a lower arm top surface,
   wherein the upper arm end portion surface, the lower portion top surface, and the lower arm top surface extend to form a longitudinal ball channel having a central longitudinal ball channel axis, the ball channel configured to receive a ball stud head of a ball stud and allow sliding longitudinal movement of the ball stud head along the central longitudinal ball channel axis, while restricting movement of the ball stud head along axes perpendicular to the central longitudinal ball channel axis.

2. The ball stud track assembly of claim 1, wherein the upper retaining arm extends from the front inner sidewall in a downward direction from a top of the ball track towards a bottom of the ball track, and the lower retaining arm extends from the lower portion in an upward direction from the bottom of the ball track towards the top of the ball track.

3. The ball stud track assembly of claim 1, wherein the base further comprises a first end wall positioned opposite a second end wall, and wherein the ball track extends between the first end wall and the second end wall.

4. The ball stud track assembly of claim 3, wherein the ball channel extends longitudinally between the first end wall and the second end wall.

5. The ball stud track assembly of claim 4, wherein the first end wall and the second end wall cover at least a portion of the ball channel at opposite ends.

6. The ball stud track assembly of claim 3, wherein the first end wall and the second end wall do not cover at least a portion of the ball channel at opposing ends.

7. The ball stud track assembly of claim 1, wherein the upper retaining arm and the lower retaining arm are both situated adjacent the front inner sidewall.

8. The ball stud track assembly of claim 1, wherein the connector portion is configured for securement to a mounting boss and is situated behind the back inner sidewall.

9. The ball stud track assembly of claim 8, wherein the connector portion includes a clip chamber sized and shaped to allow passage of a retention clip therethrough, and the retention clip is secured to a clip chamber bottom portion via a fastener, and wherein the retention clip includes boss tabs for engaging the mounting boss.

10. The ball stud track assembly of claim 1, further including a trough situated at a juncture between the lower portion top surface and the lower arm top surface.

11. The ball stud track assembly of claim 1, wherein the lower retaining arm is positioned such that upon insertion of the ball stud head into the ball track, the ball stud head contacts the upper retaining arm and the retention ridge before contacting the lower retaining arm.

12. The ball stud track assembly of claim 11, wherein when a pullout force is applied to the ball stud head, the front inner sidewall and the upper retaining arm move away from the retention ridge and create a bending moment generally about a first moment axis.

13. The ball stud track assembly of claim 12, wherein the ball track is C-shaped.

14. The ball stud track assembly of claim 1, wherein the connector portion includes a retention clip with a latch portion configured for securement to a mounting boss, wherein the retention clip extends around the mounting boss.

15. The ball stud track assembly of claim 1, wherein the connector portion includes an at least partially cylindrical boss chamber having an elongated notch portion for receiving and securing a complimentary mounting boss.

16. A ball track comprising:
   a front inner sidewall positioned opposite a back inner sidewall, wherein the back inner sidewall includes a lower portion having a lower portion top surface, and an upper portion having a retention ridge fixed in position relative to the back inner sidewall;
   a single upper retaining arm, the upper retaining arm extending from the front inner sidewall and terminating at an upper arm end portion surface; and
   a single lower retaining arm, the lower retaining arm extending from the lower portion of the back inner sidewall and having a lower arm top surface,
   wherein the upper arm end portion surface, the lower portion top surface, and the lower arm top surface extend to form a longitudinal ball channel having a central longitudinal ball channel axis, the ball channel configured to receive a ball stud head of a ball stud and allow sliding longitudinal movement of the ball stud head along the central longitudinal ball channel axis, while restricting movement of the ball stud head along axes perpendicular to the central longitudinal ball channel axis.

17. The ball track of claim 16, further including a trough situated at a juncture between the lower portion top surface and the lower arm top surface.

18. The ball track of claim 16, wherein the lower retaining arm is positioned such that upon insertion of the ball stud head into the ball track, the ball stud head contacts the upper retaining arm and the retention ridge before contacting the lower retaining arm.

19. The ball track of claim 16, wherein the front inner sidewall is translatable along a moment axis, such that removal of an inserted ball stud head from the ball channel forces the front inner sidewall to rotate away from the retention ridge.

20. The ball track of claim 19, wherein the upper retaining arm is translatable along a second moment axis, such that insertion of the ball stud head into the ball channel forces the upper retaining arm to bend inward towards the front inner sidewall.

21. A ball track comprising:
- a front inner sidewall positioned opposite a back inner sidewall, wherein the back inner sidewall includes a lower portion having a lower portion top surface, and an upper portion having a retention ridge fixed in position relative to the back inner sidewall;
- an upper retaining arm extending from the front inner sidewall and terminating at an upper arm end portion surface; and
- a lower retaining arm extending from the lower portion of the back inner sidewall and having a lower arm top surface,
- wherein the upper arm end portion surface, the lower portion top surface, and the lower arm top surface extend to form a longitudinal ball channel having a central longitudinal ball channel axis, the ball channel configured to receive a ball stud head of a ball stud and allow sliding longitudinal movement of the ball stud head along the central longitudinal ball channel axis, while restricting movement of the ball stud head along axes perpendicular to the central longitudinal ball channel axis, and wherein the ball track is asymmetrical as it extends along the central longitudinal ball channel axis.

22. The ball track of claim 21, further including a trough situated at a juncture between the lower portion top surface and the lower arm top surface.

23. The ball track of claim 21, wherein the lower retaining arm is positioned such that upon insertion of the ball stud head into the ball track, the ball stud head contacts the upper retaining arm and the retention ridge before contacting the lower retaining arm.

24. The ball track of claim 21, wherein the front inner sidewall is translatable along a moment axis, such that removal of an inserted ball stud head from the ball channel forces the front inner sidewall to rotate away from the retention ridge.

25. The ball track of claim 24, wherein the upper retaining arm is translatable along a second moment axis, such that insertion of the ball stud head into the ball channel forces the upper retaining arm to bend inward towards the front inner sidewall.

\* \* \* \* \*